(12) United States Patent
Yamamoto et al.

(10) Patent No.: US 9,884,439 B2
(45) Date of Patent: Feb. 6, 2018

(54) METHOD FOR PRODUCING FOAMED MOLDED PRODUCT

(71) Applicant: HITACHI MAXELL, LTD., Ibaraki-shi, Osaka (JP)

(72) Inventors: Satoshi Yamamoto, Settsu (JP); Atsushi Yusa, Nagaokakyo (JP); Hironori Ota, Ibaraki (JP); Tetsuya Ano, Takatsuki (JP); Hideto Goto, Muko (JP)

(73) Assignee: HITACHI MAXELL, LTD., Osaka (JP)

( * ) Notice: Subject to any disclaimer, the term of this patent is extended or adjusted under 35 U.S.C. 154(b) by 356 days.

(21) Appl. No.: 14/819,100

(22) Filed: Aug. 5, 2015

(65) Prior Publication Data

US 2015/0336307 A1 Nov. 26, 2015

Related U.S. Application Data

(63) Continuation of application No. PCT/JP2014/053137, filed on Feb. 12, 2014.

(30) Foreign Application Priority Data

Feb. 18, 2013 (JP) ................................. 2013-028568

(51) Int. Cl.
*B29C 44/10* (2006.01)
*B29C 44/34* (2006.01)
(Continued)

(52) U.S. Cl.
CPC .......... *B29C 44/10* (2013.01); *B29C 44/3446* (2013.01); *B29C 44/422* (2013.01);
(Continued)

(58) Field of Classification Search
CPC ................................ B29C 44/10; B29C 45/57
See application file for complete search history.

(56) References Cited

U.S. PATENT DOCUMENTS 4,211,523 A 7/1980 Hunerberg
5,968,429 A 10/1999 Treece et al.
(Continued)

FOREIGN PATENT DOCUMENTS

JP 2625576 B2 7/1997
JP H11-292921 A 10/1999
(Continued)

OTHER PUBLICATIONS

Oct. 13, 2016 Extended European Supplementary Search Report issued in European Patent Application No. 14751473.1.
(Continued)

*Primary Examiner* — Alison L Hindenlang
*Assistant Examiner* — Jamel M Nelson
(74) *Attorney, Agent, or Firm* — Oliff PLC

(57) ABSTRACT

A method for producing a foamed molded product includes:
using a molding apparatus including a plasticizing cylinder having a high pressure kneading zone and a pressure reduction zone; and a screw;
controlling a pressure of the pressure reduction zone to be a first pressure in a state that communication between the high pressure kneading zone and the pressure reduction zone is shut off, the first pressure being not less than an atmospheric pressure and not more than a maximum pressure of the high pressure kneading zone which is reached in a case that a molten resin is brought in contact and kneaded with a physical foaming agent;
controlling back pressure of the screw to be a second pressure which is not less than the first pressure; and
(Continued)

measuring a predetermined amount of the molten resin from which the gasified physical foaming agent has been separated.

17 Claims, 9 Drawing Sheets

(51) Int. Cl.
*B29C 44/42* (2006.01)
*B29C 44/60* (2006.01)
*B29C 45/63* (2006.01)
*B29C 45/18* (2006.01)
B29L 31/00 (2006.01)
B29C 45/00 (2006.01)
B29C 45/17 (2006.01)

(52) U.S. Cl.
CPC ............. *B29C 44/60* (2013.01); *B29C 45/18* (2013.01); *B29C 45/63* (2013.01); *B29C 2045/0079* (2013.01); *B29C 2045/1722* (2013.01); *B29C 2045/185* (2013.01); *B29L 2031/00* (2013.01)

(56) References Cited

U.S. PATENT DOCUMENTS

| | | | |
|---|---|---|---|
| 2004/0080065 | A1 | 4/2004 | Kim |
| 2011/0104380 | A1* | 5/2011 | Yusa ..................... B29C 44/348 427/443.1 |
| 2013/0285273 | A1 | 10/2013 | Yusa et al. |

FOREIGN PATENT DOCUMENTS

| | | | |
|---|---|---|---|
| JP | 2003-094477 A | 4/2003 |
| JP | 2003-154526 A | 5/2003 |
| JP | 2003-305757 A | 10/2003 |
| JP | 3788750 B2 | 6/2006 |
| JP | 3964447 B2 | 8/2007 |
| JP | 2007-230087 A | 9/2007 |
| JP | 4144916 B2 | 9/2008 |
| JP | 2009-298838 A | 12/2009 |
| WO | 92/17533 A1 | 10/1992 |
| WO | 2013/27615 A1 | 2/2013 |

OTHER PUBLICATIONS

May 13, 2015 Search Report issued in International Patent Application No. PCT/JP2014/053137.

Kimura, Kenji et al., "Reactive blending under supercritical carbon dioxide", Proceedings of 17th JSPP Symposium of Japan Society of Polymer Processing, 227 (2009).

* cited by examiner

METHOD FOR PRODUCING FOAMED MOLDED PRODUCT

CROSS REFERENCE TO RELATED APPLICATION

This application is a Continuation application of International Application No. PCT/JP2014/053137 which was filed on Feb. 12, 2014 claiming the conventional priority of Japanese patent Application No. 2013-028568 filed on Feb. 18, 2013.

BACKGROUND OF THE INVENTION

Field of the Invention

The present invention relates to a method for producing a foamed molded product with a pressurized fluid used as a physical foaming agent.

Description of the Related Art

In recent years, various types of injection molding methods and extrusion molding methods have been investigated, in which any pressurized fluid is used. Examples of the pressurized fluid include pressurized carbon dioxide and pressurized nitrogen. In the case of the molding method as described above, a fluid having an extremely high pressure is introduced into a molten resin, and hence it is possible to produce molded products having various functions. For example, in order to mutually compatibly dissolve polymers which are incompatible with each other, an injection molding method and an extrusion molding method are suggested for a polymer alloy, wherein molten resins and high pressure carbon dioxide are brought in contact and kneaded with each other in a plasticizing cylinder (Patent Literature 1: Japanese Patent Application Laid-open No. 2003-94477 and Non-Patent Literature 1: Proceedings of 17th JSPP Symposium of Japan Society of Polymer Processing, 227 (2009)). In the molding methods as described above, the molten resin and pressurized carbon dioxide are brought in contact and kneaded with each other by a kneading apparatus which is provided with a screw contained in a plasticizing cylinder.

On the other hand, a molding method is suggested, wherein supercritical carbon dioxide is introduced into a molten resin at an intermediate position of an extrusion machine having a vent portion in order to remove any hardly volatile component from a thermoplastic resin (Patent Literature 2: Japanese Patent Application Laid-open No. 11-292921). Further, an injection molding method is suggested, wherein a molten resin of thermoplastic resin is injected and charged into a mold from a plasticizing cylinder, and then a pressurized fluid, which contains supercritical carbon dioxide and a functional material such as an organic metal complex or the like, is introduced into the mold to thereby produce a thermoplastic resin molded product including the functional material dispersed on a surface (Patent Literature 3: Japanese Patent No. 3964447).

In the meantime, the solubility of pressurized carbon dioxide with respect to the resin is low. Therefore, in the case of the molding method including the step of bringing the molten resin and the pressurized carbon dioxide in contact with each other as described above, it is difficult to allow a large amount of pressurized carbon dioxide and the molten resin to be brought in contact and kneaded with each other. Therefore, in a case that the functional material is used together with pressurized carbon dioxide, it is also difficult to introduce the functional material into the molten resin at a high concentration. From such a viewpoint, a method for producing a molded product is suggested, wherein an kneading apparatus, in which an introducing port for introducing pressurized carbon dioxide is provided on an upper side surface of a plasticizing cylinder and a vent is provided on the downstream side from the introducing port, is used so that a molten resin, pressurized carbon dioxide, and a functional material are brought in contact and kneaded with each other in the plasticizing cylinder, and then the resin internal pressure of the molten resin is lowered before being injected and charged into a mold to separate only gasified carbon dioxide from the molten resin and discharge carbon dioxide from the vent (Patent Literature 4: Japanese Patent Application Laid-open No. 2009-298838 which corresponds to US2011/104380). According to this molding method, it is possible to improve the concentration of the functional material to be introduced into the molten resin, while controlling the concentration of pressurized carbon dioxide in the molten resin.

Further, in recent years, a foam injection molding method (producing method for producing a foamed molded product), using a physical foaming agent such as nitrogen and carbon dioxide in a supercritical state as the pressurized fluid, is researched and practically used (Patent Literature 5: Japanese Patent No. 2625576 which corresponds to WO92/17533; Patent Literature 6: Japanese Patent No. 3788750; Patent Literature 7: Japanese Patent No. 4144916). According to Patent Literatures 5 to 7, the physical foaming agent is introduced into a hermetically closed plasticizing cylinder, and the physical foaming agent is brought in contact with and dispersed in the plasticized and melted resin. The molten resin, in which the foaming agent is dispersed, is measured while maintaining the high pressure in the plasticizing cylinder to such an extent that the physical foaming agent is in the supercritical state, and then the molten resin is injected and charged into a mold. The supercritical fluid, which has been compatibly dissolved in the molten resin upon the injection and charging, is subjected to sudden pressure reduction and gasified. The molten resin is solidified, and thus foams (bubbles) are formed at the inside of the molded product.

The foam injection molding, which uses the supercritical fluid, is advantageous in that the process is clean, any residue of the foaming agent does not remain, and the mechanical strength of the molded product is hardly lowered because the foamed cell diameters become fine and minute, as compared with the foam injection molding which uses any chemical foaming agent. Further, the high pressure physical foaming agent functions as a plasticizer for the molten resin. Therefore, the following advantages are also provided. Namely, the viscosity of the resin is lowered upon the injection and charging, and the fluidity is improved; sink marks are suppressed, which would be otherwise caused by the shrinkage when the resin is solidified on account of the gas pressure upon the foaming; and the latent heat is deprived from the interior of the molten resin upon the foaming, and thus the cooling strain and the warpage are decreased.

Further, the supercritical fluid has a high density, and the supercritical fluid is measured (weighed) with ease. Therefore, the supercritical fluid is advantageous to stabilize the amount of introduction into the molten resin. For example, a method of Patent Literature 6 has been disclosed as a technique for stably and quantitatively supplying the physical foaming agent as described above into the plasticizing cylinder. According to Patent Literature 6, the resin internal pressure is controlled by the pressure of a load cell connected to a screw, i.e., by the back pressure of the screw (screw back pressure), and thus the supply amount of the foaming agent is controlled. Patent Literature 7 discloses a system wherein the back pressure of a screw is raised, and the pressure of the forward end of the screw at which a physical foaming agent is dissolved is maintained at a pressure in the supercritical state so that the separation is suppressed between the resin and the physical foaming agent.

The conventional foam injection molding method (method for producing foamed molded product) involves a problem or task such that the amount of the foaming agent introduced into the molten resin varies or fluctuates in every shot. The following artifice has been made to quantitatively supply an amount of the foaming agent introduced into the molten resin in the conventional foam injection molding method. Namely, for example, the internal pressure in a portion, of the plasticizing cylinder, which is located in the vicinity of the introducing port for the physical foaming agent, is subjected to the feedback, and the amount of introduction of the physical foaming agent is determined so that the differential pressure, which is provided between the pressure subjected to the feedback and the pressure of the physical foaming agent to be introduced, is constant.

However, the pressure in the portion of the plasticizing cylinder subjected to the feedback is the pressure provided one shot before, wherein the feedback is not perform in real-time. Further, the pressure in the portion of the plasticizing cylinder subjected to the feedback is obtained by detecting the screw back pressure. The amount of dissolution of the foaming agent is not completely uniform in the plasticizing cylinder. Therefore, the pressure in the plasticizing cylinder is sometimes distributed while providing the pressures different from the screw back pressure to be detected. Therefore, the amount of the foaming agent actually introduced into the molten resin is varied or fluctuated for every shot (between the shots), and it has been impossible to control the amount of the foaming agent.

Further, the conventional foam injection molding method involves another problem or task such that a measuring operation for measuring the molten resin becomes unstable including, for example, fluctuation in a time during which the molten resin is plasticized and measured (plasticizing and measuring time) and fluctuation in an amount of resin plasticized and measured (amount of resin to be charged into the mold). In the conventional foam injection molding method, it is necessary that the screw back pressure is set to be lower than an introducing pressure of the physical foaming agent into the plasticizing cylinder in order to introduce the physical foaming agent into the inside the plasticizing cylinder, and further that the introducing pressure of the physical foaming agent is set to be high (to be set as a high pressure) so that a large number of foaming nuclei are formed in the molten resin. In a case that a high pressure physical foaming agent is introduced inside the plasticizing cylinder, the resin pressure at a forward end (tip) portion of the plasticizing cylinder becomes higher than the screw back pressure in some cases. In such cases, the screw is suddenly pushed back toward a back (rear) portion of the plasticizing cylinder due to the resin pressure at the forward end portion of the plasticizing cylinder, which in turn makes the measurement operation (weight operation) for measuring (weighing) the molten resin by the screw be unstable. Further, in the conventional foam injection molding method, the differential pressure which is provided between the introducing pressure of the physical foaming agent and the screw back pressure is set to be small for the purpose of preventing the physical foaming agent from being introduced in any excessive amount. In this case, the introducing pressure of the physical foaming agent is set to be high; the screw back pressure is set also to be high. In a case that the screw back pressure is high, the screw can hardly retreat or move backward during a time wherein the plasticization and measuring is performed (during the plasticizing and measuring time), which in turn also makes the measuring operation for measuring the molten resin by the screw to be unstable. As discussed above, in the conventional foam injection molding method, the introducing pressure of a high pressure physical foaming agent affects the entire pressure in the plasticizing cylinder, and the screw back pressure is controlled based on the introducing pressure, consequently making the measuring operation for measuring the molten resin be unstable.

An object of the present teaching is to constantly stabilize the amount of a physical foaming agent to be introduced for each shot in a method of producing a foamed molded product including bringing in contact and kneading a molten resin with the physical foaming agent inside a plasticizing cylinder. Another object of the present teaching is to stabilize the measuring operation for measuring the molten resin by a screw in the plasticizing cylinder.

SUMMARY OF THE INVENTION

According to the present teaching, there is provided a method for producing a foaming molded product, the method including:

using a molding apparatus including a plasticizing cylinder having a high pressure kneading zone in which a molten resin, obtained by plasticizing a thermoplastic resin, is brought in contact and kneaded with a physical foaming agent, and a pressure reduction zone in which the gasified physical foaming agent is discharged from the molten resin brought in contact and kneaded with the physical foaming agent; and a screw arranged rotatably and movably back and forth in the plasticizing cylinder;

plasticizing the thermoplastic resin to provide the molten resin;

shutting off communication between the high pressure kneading zone and the pressure reduction zone;

bringing in contact and kneading the molten resin with the physical foaming agent in a state that the communication between the high pressure kneading zone and the pressure reduction zone is shut off;

controlling a pressure of the pressure reduction zone to be a first pressure in a state that the communication between the high pressure kneading zone and the pressure reduction zone is shut off, the first pressure being not less than an atmospheric pressure and not more than a maximum pressure of the high pressure kneading zone which is reached in a case that the molten resin is brought in contact and kneaded with the physical foaming agent;

communicating the high pressure kneading zone and the pressure reduction zone;

lowering a pressure of the molten resin brought in contact and kneaded with the physical foaming agent so as to separate the gasified physical foaming agent from the molten resin;

controlling a back pressure of the screw to be a second pressure which is not less than the first pressure;

measuring a predetermined amount of the molten resin from which the gasified physical foaming agent has been separated; and foaming and molding the measured molten resin into a desired shape.

The second pressure may be greater than the first pressure by a value in a range of 0.5 MPa to 5 MPa. Further, the second pressure may be not more than 10 MPa.

The controlling of the pressure of the pressure reduction zone may include controlling a pressure of a gas in the pressure reduction zone. Further, the controlling of the pressure of the pressure reduction zone may include introducing an inert gas into the pressure reduction zone so as to pressurize the pressure reduction zone and/or discharging the gasified physical foaming agent from the pressure reduction zone by using a back pressure valve.

In a case that the gasified physical foaming agent is separated from the molten resin, a temperature of the pressure reduction zone may be controlled to be lower than a temperature of the high pressure kneading zone. Further, in the case that the gasified physical foaming agent is separated from the molten resin, the pressure reduction zone may be cooled. Furthermore, a process, in which the molten resin and the physical foaming agent are brought in contact and kneaded with each other and the gasified physical foaming agent is separated from the molten resin, may be repeated a plurality of times in a state that the molten resin is allowed to stay in the high pressure kneading zone. Moreover, a process, in which the high pressure kneading zone and the pressure reduction zone are communicated with each other and shut off from each other, may be repeated a plurality of times.

The physical foaming agent, which is to be brought in contact and kneaded with the molten resin, may be supplied to the high pressure kneading zone without controlling a supply amount of the physical foaming agent. The physical foaming agent may be pressurized nitrogen or pressurized carbon dioxide. Further, a concentration of the physical foaming agent in the molten resin may be allowed to approach a saturated solubility by separating the gasified physical foaming agent from the molten resin.

The physical foaming agent may be pressurized carbon dioxide and may further contain a functional material. Further, the functional material may be a metal complex.

The communication between the high pressure kneading zone and the pressure reduction zone may be shut off in accordance with a rotation state of the screw. Further, the communication between the high pressure kneading zone and the pressure reduction zone may be shut off by reverse rotation of the screw. Furthermore, the high pressure kneading zone and the pressure reduction zone may be communicated with each other by any one of forward rotation of the screw, stop of rotation of the screw, and decrease in a number of reverse rotation of the screw.

DESCRIPTION OF THE PREFERRED EMBODIMENTS

In the following, a production method for producing a foamed molded product according to the present teaching will be explained with reference to the drawings. The production method for producing a foamed molded product of an embodiment of the present teaching is a foam injection molding method, and can be practiced, for example, by using a molding machine 1000 depicted in FIG. 2. At first, the molding machine 1000 will be explained.

<Molding Machine>

Figure 2:
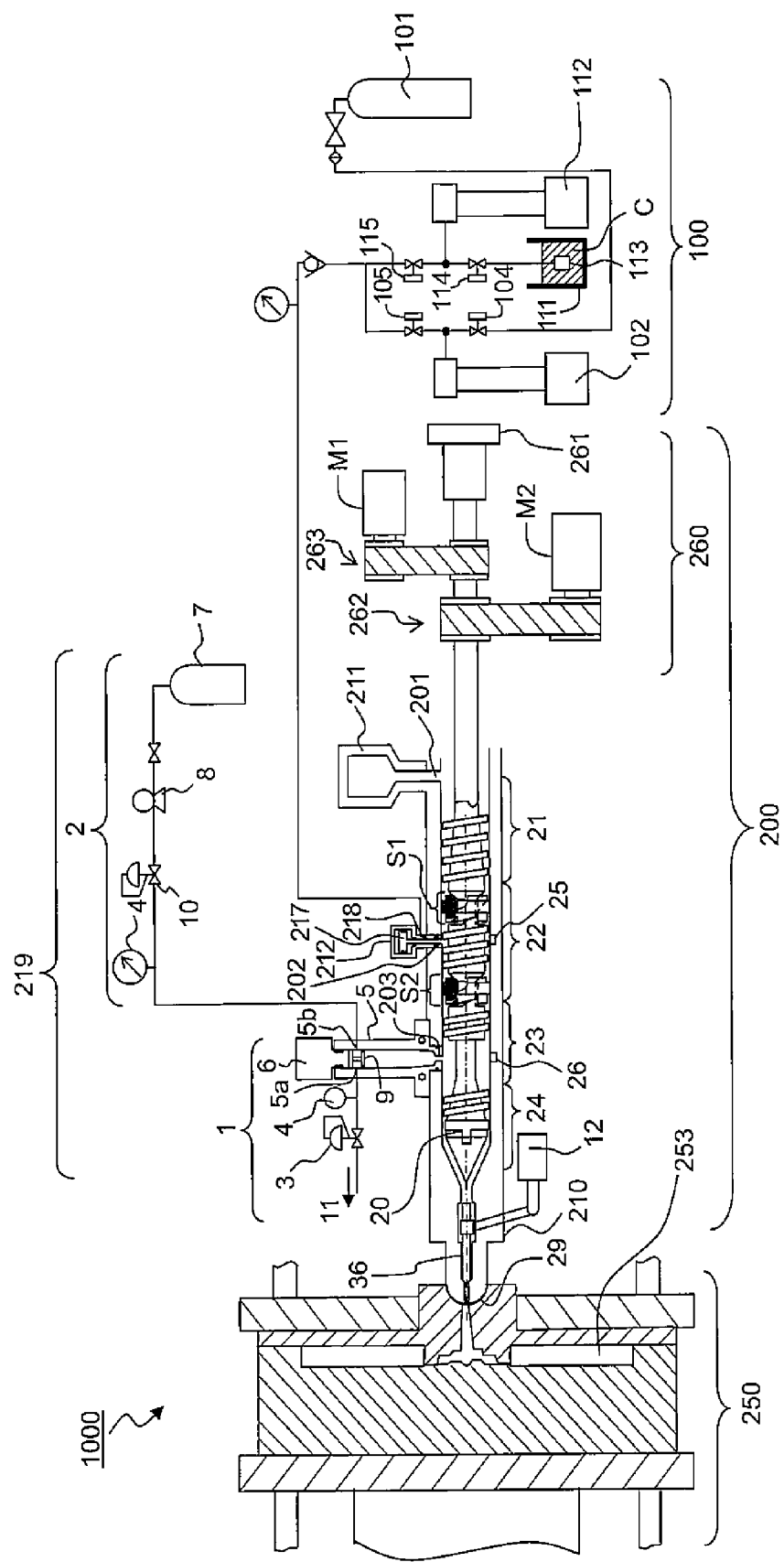
FIG. 2 is a schematic cross-sectional view depicting a molding machine used in the embodiment.

As depicted in FIG. 2, the molding machine 1000 is provided with a kneading apparatus 200 having a plasticizing cylinder 210, a physical foaming agent supplying apparatus 100 which supplies a physical foaming agent to the plasticizing cylinder 210, a clamping unit 250 provided with a mold, and a control unit (not depicted in the drawing) which controls the operations of the physical foaming agent supplying apparatus 100, the kneading apparatus 200 and the clamping unit 250. Further, a shutoff valve 36, which is opened/closed in accordance with driving of an air cylinder 12, is provided at a nozzle forward end 29 of the kneading apparatus 200 so that the interior of the plasticizing cylinder 210 can be retained at a high pressure. A mold is brought in tight contact with the nozzle forward end 29, and a molten resin is injected and charged from the nozzle forward end 29 into a cavity 253 formed by the mold.

The kneading apparatus 200 depicted in FIG. 2 includes the plasticizing cylinder 210, a screw 20 which is arranged rotatably and movably back and forth in the plasticizing cylinder 210, a screw driving mechanism 260 which drives the screw 20, an upstream side seal mechanism S1 and a downstream side seal mechanism S2 which are arranged in the plasticizing cylinder 210, and a pressure reduction zone pressure adjusting mechanism 219 which is connected to the plasticizing cylinder 210. In this embodiment, a plasticized and melted molten resin is allowed to flow from the right to the left in the plasticizing cylinder 210 as viewed in FIGS. 2 to 4. Therefore, the right as viewed in FIGS. 2 to 4 is defined as "upstream" or "backward", and the left as viewed in FIGS. 2 to 4 is defined as "downstream" or "forward (frontward)" at the inside of the plasticizing cylinder 210 according to the embodiment of the present teaching.

The screw driving mechanism 260 is connected to a rear end portion on the upstream side of the plasticizing cylinder 210, and has a screw rotation driving mechanism including a screw rotation motor M2 and a transmitting means 262, a screw moving mechanism including a screw advancing-retreating motor M1 and a transmitting means 263, and a pressure sensor 261 such as a load cell detecting pressure applied to the screw 20. The screw rotating motor M2 rotates the screw 20 via the transmitting means 262 constructed of a pulley, a belt, etc., and the screw advancing-retreating motor M1 moves the screw 20 in the axial direction via the transmitting means 263 which converts the rotary motion of a pulley, a belt, a ball screw/nut mechanism, etc. into a linear motion. The pressure sensor 261 detects a back pressure of the screw (screw back pressure). The term "back pressure of screw (screw back pressure)" means a pressure by which the screw 20 is pushed in a back-to-front direction when a resin is plasticized and measured, namely when a molten resin is moved to a forward portion of the plasticizing cylinder 210 by a forward rotation of the screw 20 and the screw is moved backward by the pressure brought about by the resin. In this embodiment, the screw back pressure is controlled by the screw driving mechanism 260.

Figure 3:
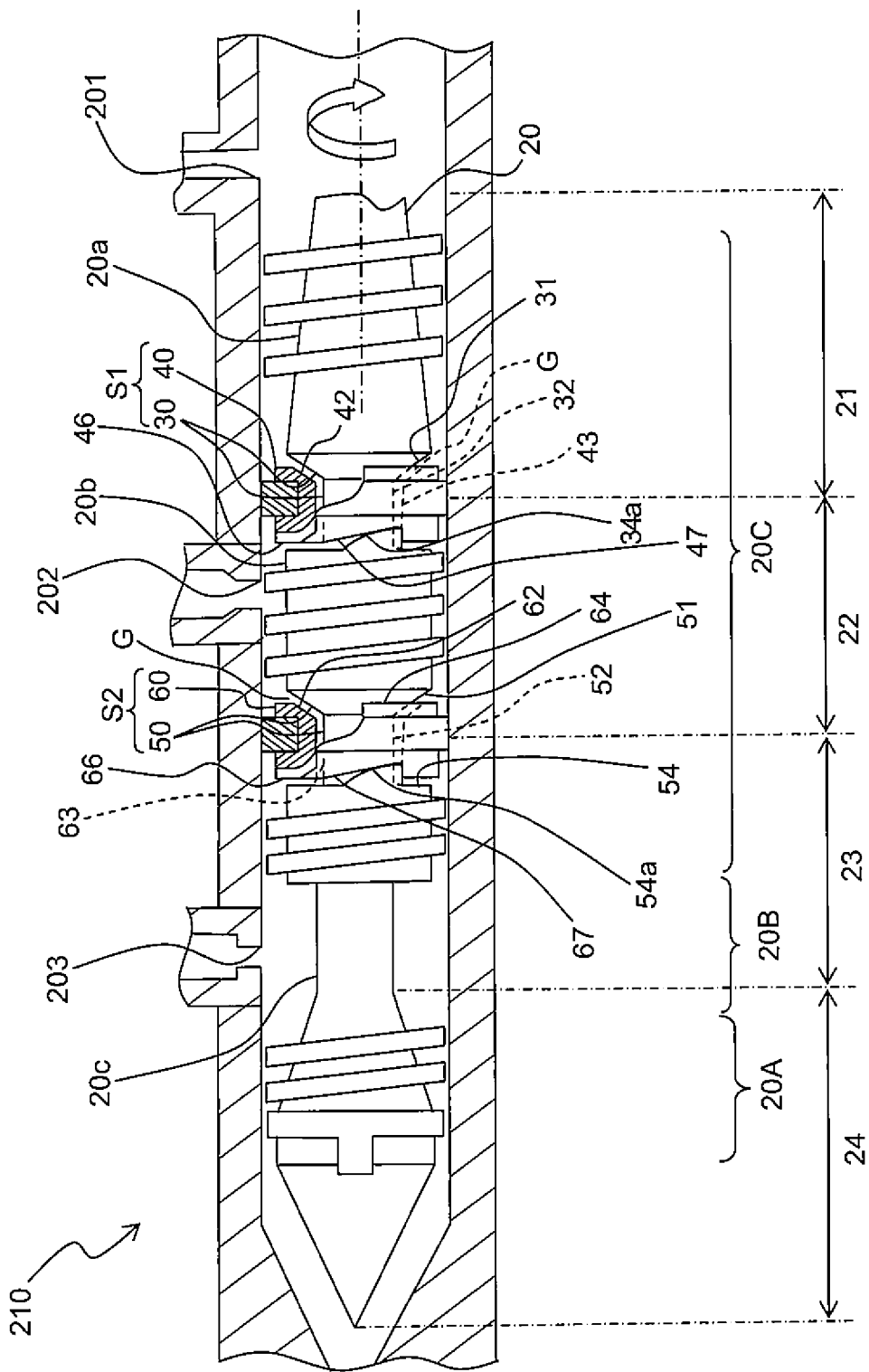
FIG. 3 is a schematic cross-sectional view of main parts or components of a kneading apparatus used in the embodiment, depicting a state that a high pressure kneading zone and a pressure reduction zone are communicated with each other.
Figure 4:
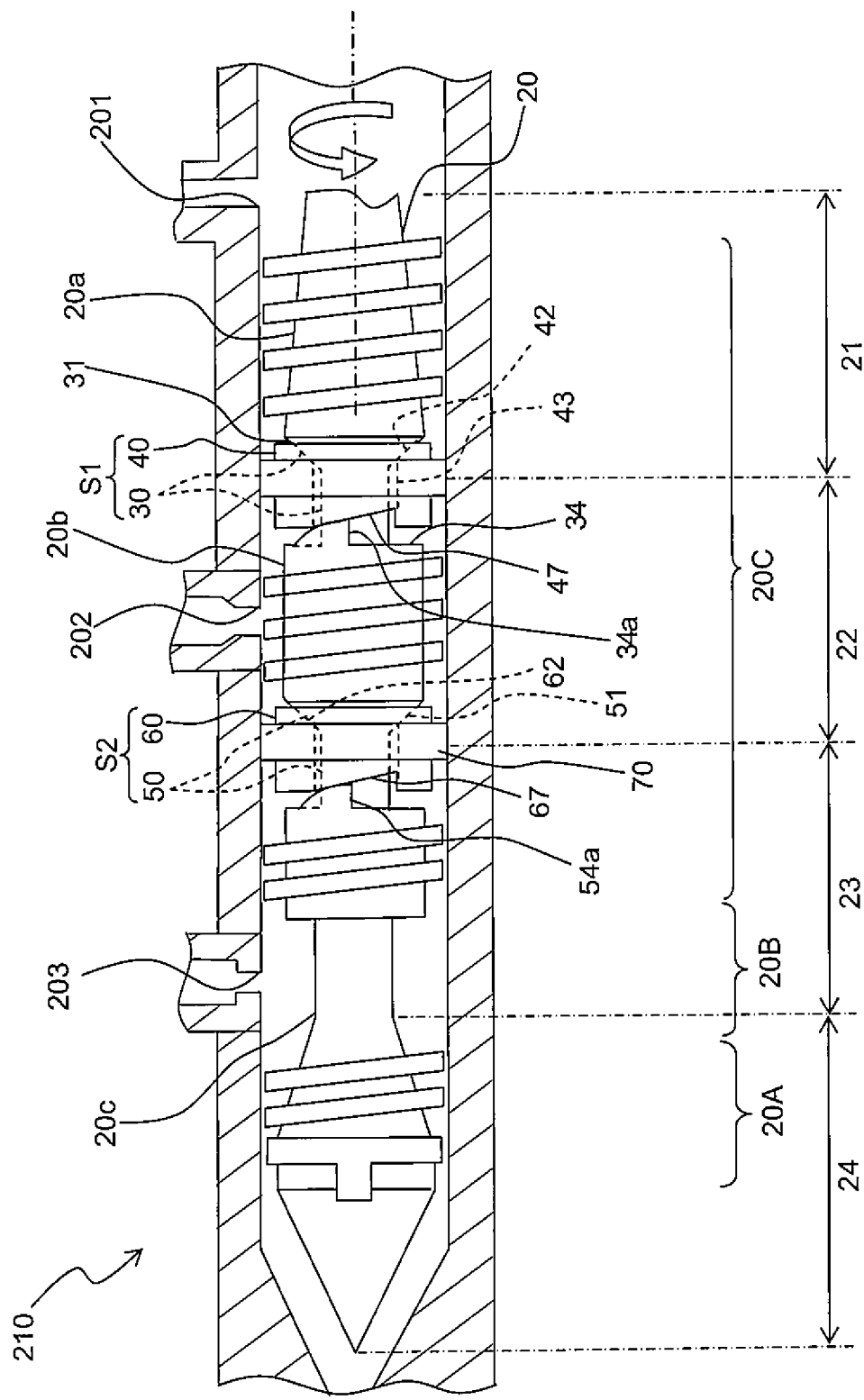
FIG. 4 is a schematic cross-sectional view of the main parts or components of the kneading apparatus used in the embodiment, depicting a state that the communication between the high pressure kneading zone and the pressure reduction zone is shut off.

Note that, as depicted in FIGS. 3 and 4, the kneading apparatus 200 of this embodiment is constructed in the same manner as the construction of any conventionally known kneading apparatus, so that the forward rotation is performed to feed the molten resin frontwardly (toward the nozzle portion) when the screw 20 is rotated counterclockwise, while the reverse rotation is performed when the screw 20 is rotated clockwise, as viewed from the backward side of the plasticizing cylinder 210.

Those formed on the upper side surface of the plasticizing cylinder 210 are, as referred to in the following order from the upstream side, a resin supply port 201 for supplying a thermoplastic resin to the plasticizing cylinder 210, an introducing port 202 for introducing a physical foaming agent into the plasticizing cylinder 210, and a vent 203 for discharging gasified physical foaming agent (a gasified portion of the physical foaming agent) from the inside of the plasticizing cylinder 210 as necessary. A resin supplying hopper 211 and an introducing valve 212 are arranged for the resin supply port 201 and the introducing port 202, respectively, and the pressure reduction zone pressure adjusting mechanism 219 is connected to the vent 203. Further, the introducing valve 212 is connected to the physical foaming agent supplying apparatus 100 which is provided outside the kneading apparatus 200.

Further, a band heater (not depicted) is arranged on an outer wall surface of the plasticizing cylinder 210. Accordingly, the plasticizing cylinder 210 is heated by the band heater, and the thermoplastic resin is plasticized. Furthermore, sensors 25, 26, which monitor the pressure and the temperature, are provided on the lower side surface of the plasticizing cylinder 210, at a position opposed to the introducing port 202 and a position opposed to the vent 203 respectively.

In the kneading apparatus 200 having the structure as described above, the thermoplastic resin is supplied from the resin supply port 201 into the plasticizing cylinder 210, and the thermoplastic resin is plasticized by the band heater to provide the molten resin which is fed to the downstream in accordance with the forward rotation of the screw 20. The molten resin, which is fed to a position in the vicinity of the introducing port 202, is brought in contact and kneaded with the introduced physical foaming agent at a high pressure. Subsequently, the resin internal pressure of the molten resin brought in contact and kneaded with the physical foaming agent is lowered by adjusting the pressure of the atmosphere of the molten resin so that the resin internal pressure is not more than the maximum pressure which is achieved when the molten resin is brought in contact and kneaded with the physical foaming agent. By doing so, a gasified physical foaming agent is separated from the molten resin, and the gasified foaming agent is discharged from the vent 203. Then, the molten resin, which is further fed frontwardly, is extruded to the forward end portion of the screw 20. The pressure of the molten resin serves as the reaction force with respect to the screw 20. The screw 20 is moved backwardly by the reaction force, and thus the measuring is performed. Accordingly, a plasticizing zone 21 in which the thermoplastic resin is plasticized to provide the molten resin, a high pressure kneading zone 22 in which the molten resin and the physical foaming agent introduced from the introducing port 202 are brought in contact and kneaded with each other at the high pressure, and a pressure reduction zone 23 in which the portion of the physical foaming agent, separated from the molten resin, is discharged from the vent 203 by lowering the resin internal pressure of the molten resin brought in contact and kneaded with the physical foaming agent are formed in the plasticizing cylinder 210, as referred to in this order from the upstream side. Further, a remelting zone 24 is provided on the downstream from the pressure reduction zone 23. As will be described later on, in this embodiment, the viscosity of the molten resin is raised in the pressure reduction zone. The molten resin, which has the raised viscosity, is plasticized and melted again before being injected in the remelting zone 24. Note that in order to efficiently perform the contact and kneading for the molten resin and the physical foaming agent, a plurality of pieces of the introducing port 202 and a plurality of pieces of the vent 203 may be provided for the plasticizing cylinder 210, and a plurality of pieces of the high pressure kneading zone 22 and a plurality of pieces of the pressure reduction zone 23 may be formed in the plasticizing cylinder 210.

As depicted in FIGS. 2 to 4, the upstream side seal mechanism S1 and the downstream side seal mechanism S2, which temporally shuts off the communication state between the plasticizing zone 21, the high pressure kneading zone 22 and the pressure reduction zone 23 as described above, are arranged between the zones 21 and 22 and between the zones 22 and 23, respectively. Accordingly, for example, when the physical foaming agent is introduced into the high pressure kneading zone 22, the upstream side and the downstream side of the high pressure kneading zone 22 are mechanically sealed, and the high pressure kneading zone 22 can be reliably disconnected (shut off) from the adjoining zones 21, 23. As a result, the pressure of the high pressure kneading zone 22 is maintained at a high pressure. Therefore, the physical foaming agent can be effectively permeated into the molten resin. Various mechanisms are available for the upstream side seal mechanism S1 and the downstream side seal mechanism S2, provided that the communication between the zones 21, 22, 23 is shut off. However, it is preferable to use those which shuts off the communication between these zones in accordance with the rotation state of the screw 20 as described later on.

The pressure reduction zone pressure adjusting mechanism 219 controls the pressure of the pressure reduction zone 23 so that the pressure has a predetermined value when the communication between the high pressure kneading zone 22 and the pressure reduction zone 23 is shut off by the downstream side seal mechanism S2 described above. The pressure reduction zone pressure adjusting mechanism 219 has, for example, a buffer container 5, a gas discharge mechanism 1 which is connected to a gas discharge port 11 via a pressure gauge 4 and a back pressure valve 3 from a connection port 5a of the buffer container 5, and a pressurizing mechanism 2 which is connected from an inert gas bomb 7 for an inert gas such as nitrogen or the like to a connection port 5b of the buffer container 5 via a booster pump 8, a pressure-reducing valve 10, and a pressure gauge 4.

The pressure reduction zone pressure adjusting mechanism 219 controls the pressure in the pressure reduction zone 23 of the plasticizing cylinder 210 by the gas discharge mechanism 1 and/or the pressurizing mechanism 2 so that the pressure in the pressure reduction zone 23 has a predetermined value. For example, the back pressure valve 3 of the gas discharge mechanism 1 is set to have a predetermined value, and the discharge amount of the gas of the physical foaming agent is restricted. Accordingly, it is possible to control the pressure in the pressure reduction zone 23. On the contrary, if it is necessary to raise the pressure in the pressure reduction zone 23, then the pressure-reducing valve 10 of the pressurizing mechanism 2 is set to have a predetermined value, and the inert gas such as pressurized nitrogen or the like is introduced into the pressure reduction zone 23 from the inert gas bomb 7. Accordingly, it is possible to control the pressure in the pressure reduction zone 23. In a case that the pressure in the pressure reduction zone 23 is raised by the pressurizing mechanism 2 before the start of the molding, then it is possible to suppress the vent up which would be otherwise caused by the sudden pressure reduction, and hence this procedure is preferred. The term "vent up" means such a phenomenon that the molten resin leaks, from a discharge port (vent 203) for discharging physical foaming agent which is subjected to the pressure reduction and is gasified, simultaneously with the gasified physical foaming agent. In this way, in the embodiment of the present teaching, the pressure reduction zone pressure adjusting mechanism 219 controls the pressure of the gas in the pressure reduction zone 23. Note that, the pressure in the pressure reduction zone 23 needs to be retained to be not less than the atmospheric pressure. Therefore, the pressure reduction zone pressure adjusting mechanism 219 of this embodiment does not have any pressure-reducing mechanism such as a vacuum pump or the like.

The kneading apparatus 200 may be further provided with a temperature regulating mechanism such as a cooling mechanism or the like for the pressure reduction zone 23. By providing the temperature regulating mechanism such as the cooling mechanism or the like for the pressure reduction zone 23 to thereby cool the pressure reduction zone 23, it is possible to raise the viscosity of the molten resin in the pressure reduction zone 23. Accordingly, it is possible to avoid the vent up which would be otherwise caused when the physical foaming agent is discharged. In this embodiment, a cooling jacket (not depicted) is provided as the cooling mechanism around the pressure reduction zone 23 of the plasticizing cylinder 210.

As depicted in FIGS. 3 and 4, the following arrangement is also available in relation to the kneading apparatus 200 of this embodiment. Namely, the screw 20 has first and second flight portions 20A, 20C which have flights, and a flat portion 20B which is interposed between the first and second flight portions and which has no flight, wherein at least a part of the flat portion 20B is positioned in the pressure reduction zone 23 when the physical foaming agent is discharged. The flat portion 20B is capable of effectively feeding the resin, of which viscosity is raised in the above-described pressure reduction zone 23, in the backward direction.

Further, the resin in the semi-solidified state, which is cooled in the pressure reduction zone 23, is heated again, plasticized, and melted in the remelting zone 24 before being injected.

<Seal Mechanism>

Next, an explanation will be given about the upstream side seal mechanism S1 and the downstream side seal mechanism S2 arranged inside the plasticizing cylinder 210. Various mechanisms can be utilized for the upstream side seal mechanism S1 and the downstream side seal mechanism S2, provided that the communication between the zones 21, 22 and 23 can be shut off. However, in this embodiment, the mechanisms, which communicate/shut off the zones in accordance with the rotation state of the screw 20, are used as explained below.

As depicted in FIGS. 3 and 4, the upstream side seal mechanism S1 and the downstream side seal mechanism S2, which make communication and disconnection (shut off) between the plasticizing zone 21, the high pressure kneading zone 22, and the pressure reduction zone 23 described above in accordance with the rotation state of the screw 20, are arranged between the zones 21 and 22 and between the zones 22 and 23, respectively. Accordingly, when the physical foaming agent is introduced into the high pressure kneading zone 22, the upstream side and the downstream side of the high pressure kneading zone 22 are mechanically sealed in accordance with the rotation state of the screw 20. Therefore, the communication between the high pressure kneading zone 22 and the adjoining zones 21, 23 can be reliably shut off. According to the seal mechanisms S1, S2 of this embodiment, the high pressure kneading zone 22 can be communicated and disconnected with respect to the adjoining zones 21, 23 in accordance with the rotation state of the screw 20 without using any pressure control. Therefore, the flow resistance of the molten resin is small. Further, the high pressure kneading zone 22 can be sealed from the adjoining zones 21, 23 in accordance with the rotation state of the screw 20. Therefore, the pressure of the high pressure kneading zone 22 can be maintained at any arbitrary timing. Therefore, even when the resin having a high viscosity is brought in contact and kneaded with the physical foaming agent, it is possible to maintain the high plasticizing ability. With the usage of the mechanical seal mechanisms S1, S2 which exhibit the sealing performance in accordance with the rotation state of the screw 20 as described above, the sealing performance is scarcely deteriorated even when the high temperature molten resin passes through the seal mechanisms S1, S2. Therefore, the pressure of the high pressure kneading zone 22 is scarcely changed even after the molding machine is operated for a long period of time. Therefore, it is possible to stably produce the thermoplastic resin molded product (foamed molded product) for a long period of time. The seal mechanisms S1, S2 communicate and disconnect the high pressure kneading zone 22 with respect to the adjacent zones 21, 23 in accordance with the rotation state of the screw 20. Therefore, for example, by performing the forward rotation and the reverse rotation of the screw 20 at arbitrary timings, the resin internal pressure of the molten resin brought in contact and kneaded with the physical foaming agent can be lowered in a state that the molten resin is allowed to stay in the high pressure kneading zone 22, and the gasified physical foaming agent can be separated from the molten resin. As a result, the molten resin, in which the concentration of the physical foaming agent is lowered, can be repeatedly brought in contact and kneaded with the physical foaming agent without feeding the molten resin frontwardly, thereby making it possible to produce a molded product in which the functional material contained in the physical foaming agent is dispersed at a high concentration.

In the kneading apparatus 200 of this embodiment, the seal mechanism, which communicates and disconnects the high pressure kneading zone 22 with respect to the adjoining other zones 21, 23 in accordance with the rotation state of the screw 20 described above, is preferably provided at least on the downstream side of the high pressure kneading zone 22. It is more preferable that the seal mechanisms are provided on both of the upstream side and the downstream side of the high pressure kneading zone 22. Namely, as understood from FIGS. 3 and 4, when the physical foaming agent is introduced into the high pressure kneading zone 22, the physical foaming agent having a high pressure (high pressure physical foaming agent) acts on the upstream side seal mechanism S1 so that the plasticizing zone 21 and the high pressure kneading zone 22 are disconnected from each other on the upstream side of the high pressure kneading zone 22. On the other hand, on the downstream side of the high pressure kneading zone 22, the physical foaming agent and the molten resin allowed to flow from the upstream side act on the downstream side seal mechanism S2 so that the high pressure kneading zone 22 and the pressure reduction zone 23 are communicated with each other. Usually, the molten resin is charged on the upstream side of the high pressure kneading zone 22, and the physical foaming agent hardly leaks, because the seal mechanism is provided in the flow direction of the resin, i.e., in the direction so as to oppose the pressure gradient. Therefore, in a case that a simple and convenient seal mechanism such as a check valve (non-return valve) or the like having a low spring pressure is arranged on the upstream side of the high pressure kneading zone 22, and that the downstream side seal mechanism S2 which communicates and disconnects the high pressure kneading zone 22 and the pressure reduction zone 23 in accordance with the rotation state of the screw 20 is arranged at least on the downstream side of the high pressure kneading zone 22, then the high pressure kneading zone 22 in which the sealing performance tends to be lowered or deteriorated can be reliably disconnected from the pressure reduction zone 23, and the high pressure state of the high pressure kneading zone 22 can be maintained during the contact and kneading. In this embodiment, the upstream side seal mechanism S1 and the downstream side seal mechanism S2, which are basically constructed in the same manner, are used. Therefore, the following explanation will be made principally about the downstream side seal mechanism S2.

Figure 5:
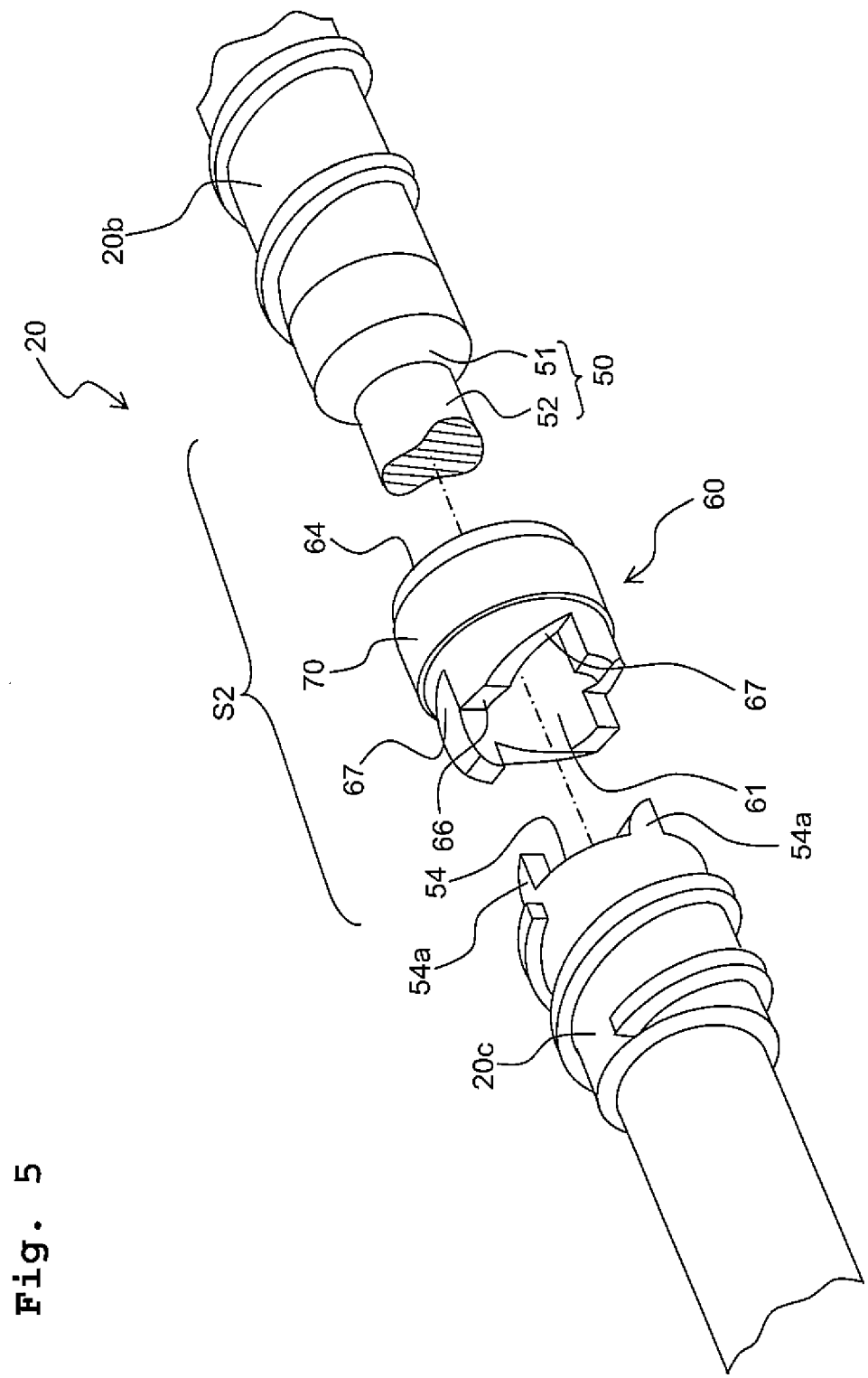
FIG. 5 is a schematic perspective view depicting an example of a seal mechanism of the kneading apparatus used in the embodiment.

As depicted in FIG. 5, the screw 20 of this embodiment has a reduced diameter portion 50 which is disposed in a boundary area between the high pressure kneading zone 22 and the pressure reduction zone 23 and which has a reduced diameter as compared with those of portions of the screw 20 corresponding to areas adjacent to the boundary area. A downstream side seal ring 60 is externally fitted to the reduced diameter portion 50 in such a loosely fitted state that the downstream side seal ring 60 is movable in the axial direction (front-back direction) within a range of the reduced diameter portion 50. The downstream side seal mechanism S2 is constructed by the reduced diameter portion 50 and the downstream side seal ring 60. The upstream side seal mechanism S1 is also constructed by a reduced diameter portion 30 and an upstream side seal ring 40 in the same manner as the downstream side seal mechanism S2. The screw 20 is divided into a first screw portion 20a, a second screw portion 20b, and a third screw portion 20c as disposed in this order from the upstream side in order that the upstream side and downstream side seal rings 40, 60 are externally fitted to the reduced diameter portions 30, 50, respectively (see FIG. 3).

The reduced diameter portion 50, which is arranged between the high pressure kneading zone 22 and the pressure reduction zone 23, is constructed by a truncated cone portion (seal portion) 51 which is interconnected from the second screw portion 20b disposed on the upstream side and which has a tapered surface inclined frontwardly (toward the downstream side), and a cylindrical portion 52 which is interconnected from the truncated cone portion 51 and which has a horizontal surface extending horizontally in the axial direction. Projections 54a, which serve as fastening portions to prevent the downstream side seal ring 60 from being rotated, are formed on an end surface 54, of the third screw portion 20c disposed on the downstream side, at a plurality of positions at predetermined intervals in the circumferential direction of the end surface 54. Note that the structure of the reduced diameter portion 50 is not specifically limited provided that the high pressure kneading zone 22 and the pressure reduction zone 23 can be communicated with each other and disconnected from each other. For example, the reduced diameter portion 50 may have such a structure that cylindrical portions having different diameters are interconnected to each other. Alternatively, the reduced diameter portion 50 may have such a structure that the truncated cone portion 51 is arranged on the downstream side.

Figure 6:
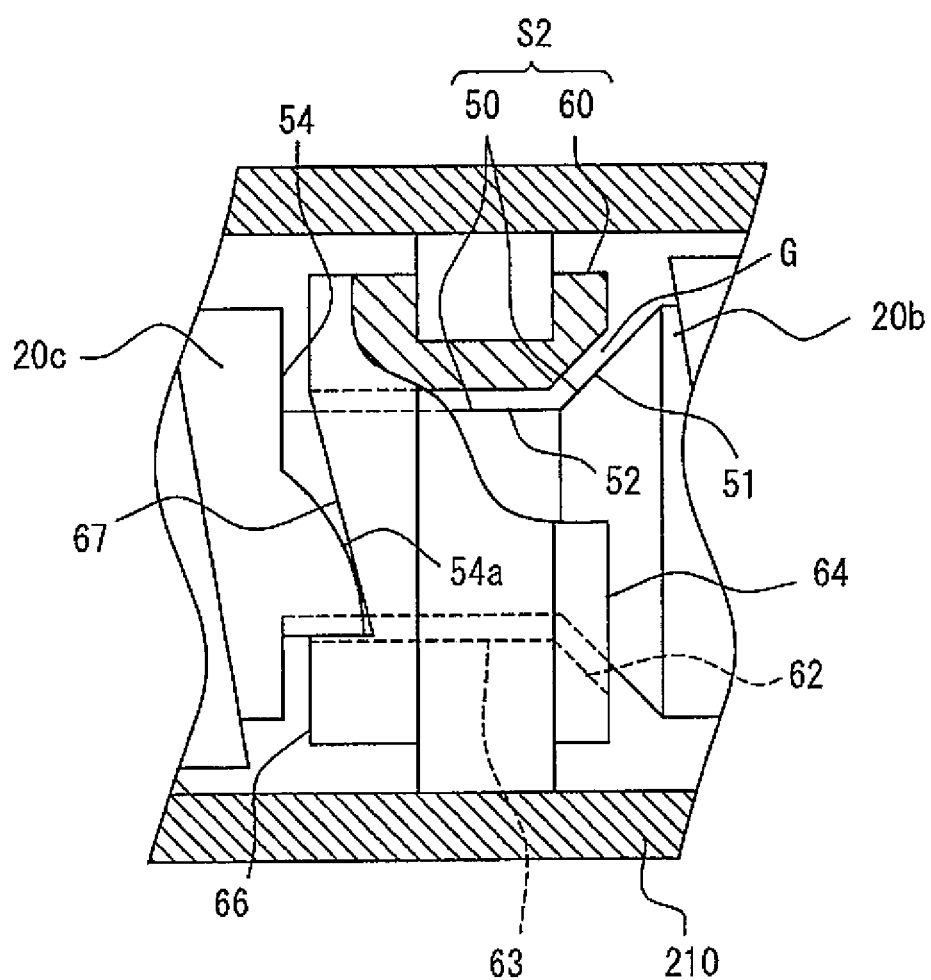
FIG. 6 is a schematic enlarged cross-sectional view of main parts or components of an example of the seal mechanism of the kneading apparatus used in the embodiment.
Figure 7:
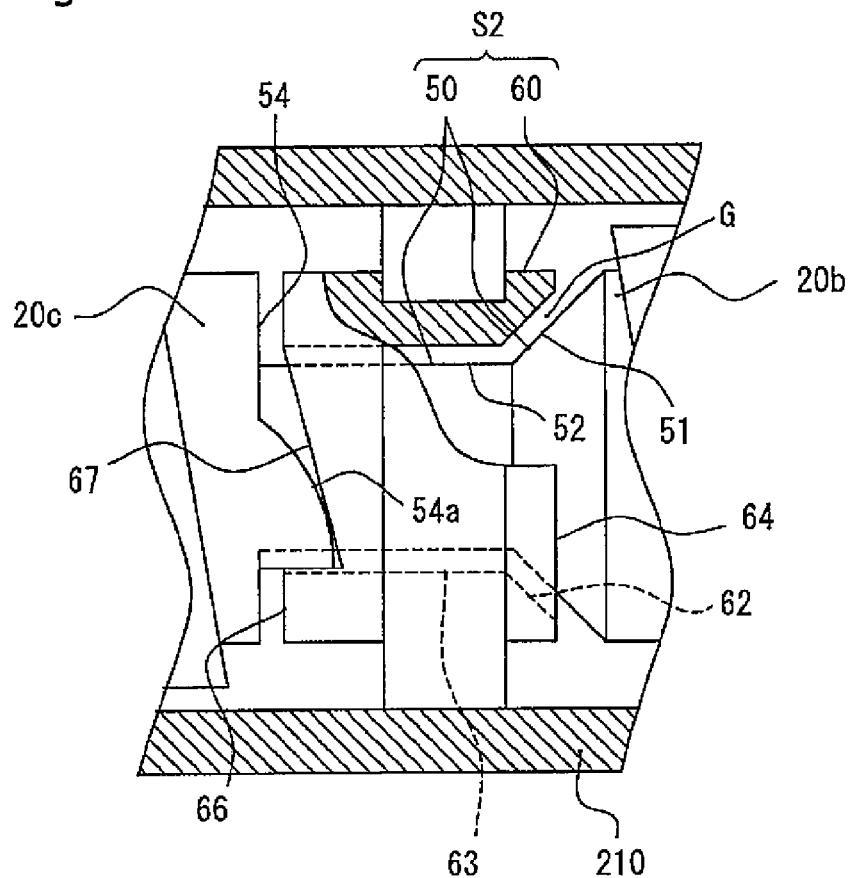
FIG. 7 is a schematic enlarged cross-sectional view of main parts or components of another example of the seal mechanism of the kneading apparatus used in the embodiment.

As depicted in FIG. 5, the downstream side seal ring 60 has a through-hole 61 so that the downstream side seal ring 60 is externally fitted to the reduced diameter portion 50 of the screw 20. Further, as depicted in FIGS. 6 and 7, the through-hole 61 is constructed by interconnecting, on the upstream side, a tapered portion 62 which has a tapered surface (contact surface) having diameters reduced frontwardly (toward the downstream side) and an annular portion 63 which extends horizontally frontwardly (toward the downstream side) from the tapered portion 62. The tapered surface of the tapered portion 62 of the downstream side seal ring 60 is formed to abut against at least a part of the tapered surface of the truncated cone portion 51 of the screw 20 in a tight contact state. Note that the structure of the through-hole 61 is not specifically limited provided that the high pressure kneading zone 22 and the pressure reduction zone 23 can be connected with each other and disconnected from each other. For example, the through-hole 61 may have such a structure that a plurality of annular portions having different inner diameters are formed. Alternatively, the through-hole 61 may have such a structure that the tapered portion 62 is arranged on the downstream side. Further, the inner diameter of the annular portion 63 of the through-hole 61 is formed to be larger than the diameter of the cylindrical portion 52 of the reduced diameter portion 50 described above so that the downstream side seal ring 60 is movable in the axial direction within a range of the reduced diameter portion 50 of the screw 20. Cutouts 67, which are inclined to be deep in the clockwise direction as viewed from the downstream side, are formed as fastening objective portions on a downstream side ring surface 66 of the downstream side seal ring 60, at a plurality of positions in the circumferential direction of the downstream side ring surface 66. Accordingly, the downstream side seal ring 60 is movable in the axial direction within a range of the depth of the cutout 67 with respect to the screw 20 in accordance with the rotation state of the screw 20; when the projections 54a are engaged with the cutouts 67, any further movement of the downstream side seal ring 60 in the axial direction is regulated with respect to the screw 20.

Therefore, as depicted in FIG. 3, when the downstream side seal ring 60 is moved to the downstream side with respect to the screw 20, then the tapered surface of the truncated cone portion 51 is separated from the tapered surface of the tapered portion 62, and a gap G, which serves as the passage (path) for the molten resin and the physical foaming agent, is opened between the inner circumferential surface of the downstream side seal ring 60 and the outer circumferential surface of the reduced diameter portion 50 of the screw 20. On the other hand, as depicted in FIG. 4, when the downstream side seal ring 60 is moved to the upstream side with respect to the screw 20, then the tapered surface of the truncated cone portion 51 abuts against the tapered surface of the tapered portion 62, and the gap G is closed between the inner circumferential surface of the downstream side seal ring 60 and the outer circumferential surface of the reduced diameter portion 50 of the screw 20. Further, when the downstream side seal ring 60 is moved to the upstream side, and the projections 54a and the cutouts 67 are engaged with each other, then the movement of the downstream side seal ring 60 is regulated. Therefore, the downstream side seal ring 60 corotates together with the screw 20. Accordingly, the abutment state is maintained between the tapered surface of the truncated cone portion 51 and the tapered surface of the tapered portion 62 during the contact and kneading, thereby making it possible to reliably seal the high pressure kneading zone 22. However, when the communication is made between the plasticizing zone 21 and the high pressure kneading zone 22 and between the high pressure kneading zone 22 and the pressure reduction zone 23, then a state is given, in which the tapered surfaces of the truncated cone portions 31, 51 and the tapered surfaces of the tapered portions 42, 62 are separated from each other, and the molten resin or further the physical foaming agent is/are allowed to advance into the gap G from the upstream side. Therefore, when the upstream side and downstream side seal rings 40, 60 are moved to the downstream side, the tapered surfaces of the truncated cone portions 31, 51 hardly abut against the tapered surfaces of the tapered portions 42, 62, even when the upstream side and downstream side seal rings 40, 60 do not corotate together with the screw 20. Therefore, it is possible to maintain the communicated state between the high pressure kneading zone 22 and the adjoining zones 21, 23. Note that any arbitrary structure can be adopted for each of the fastening portions and the fastening objective portions which are provided for the screw 20 and the upstream side and downstream side seal rings 40, 60 respectively, provided that the structure enables the upstream side and downstream side seal rings 40, 60 to corotate together with the screw 20 in the rotation-prevented (stopped) state when the fastening portions and the fastening objective portions are engaged with each other. For example, a pin may be used as the fastening portion or the fastening objective portion. Further, the fastening portion may be provided on the downstream side of the second screw portion 20b and the fastening objective portion may be provided on the upstream side of the downstream side seal ring 60 in conformity with the structure of the truncated cone portion 51 and/or the tapered portion 62.

An outer seal member 70 made of metal is fitted to the outer circumferential surface of the downstream side seal ring 60 so that the outer seal member 70 protrudes from the outer circumferential surface of the downstream side seal ring 60. Accordingly, the sealing performance is secured between the downstream side seal ring 60 and the plasticizing cylinder 210. An outer seal member made of resin may be used. Further, as depicted in FIG. 6, the downstream side seal ring 60 of this embodiment has such a configuration that the outer diameter of an upstream side ring surface 64 is formed to be larger than the diameter of the second screw portion 20b which is disposed on the upstream side and which faces (is opposite to) the upstream side ring surface 64. Therefore, when the high pressure kneading zone 22 and the pressure reduction zone 23 are disconnected from each other, the downstream side seal ring 60 is arranged in such a mode that the downstream side seal ring 60 slightly protrudes from the second screw portion 20b in the radial direction on the upstream side. However, as depicted in FIG. 7, the outer diameter of the upstream side ring surface 64 may be formed to be substantially the same as or smaller than the diameter of the second screw portion 20b which is disposed on the upstream side and which is opposite to the upstream side ring surface 64. Namely, in the high pressure kneading zone 22, the high pressure physical foaming agent is introduced from the introducing port 202. Therefore, in a case that the outer diameter of the upstream side ring surface 64 is larger than the diameter of the second screw portion 20b which is disposed on the upstream side and which is opposite to the upstream side ring surface 64 (FIG. 6), the upstream side ring surface 64, which protrudes from the screw 20, is pushed frontwardly by the pressure brought about by the physical foaming agent. Accordingly, it is possible to immediately make communication between the high pressure kneading zone 22 and the pressure reduction zone 23 by stop of the rotation of the screw 20 or decrease in the number of the reverse rotation (the number of revolutions of the reverse rotation), without forward rotation of the screw 20. On the other hand, in a case that the outer diameter of the upstream side ring surface 64 is substantially the same as or smaller than the diameter of the second screw portion 20b which is disposed on the upstream side and which is opposite to the upstream side ring surface 64 (FIG. 7), the pressure, which is brought about by the physical foaming agent, is not applied to the upstream side ring surface 64. Therefore, the high pressure kneading zone 22 and the pressure reduction zone 23 can be disconnected from each other more reliably during the contact and kneading.

Note that the construction of the upstream side seal mechanism S1 is the same as or equivalent to that of the downstream side seal mechanism S2 described above. As depicted in FIGS. 2 to 4, the reduced diameter portion 30 having the truncated cone portion (seal portion) 31 is arranged between the plasticizing zone 21 and the high pressure kneading zone 22, and projections 34a are provided on an end surface 34 of the second screw portion 20b disposed on the upstream side. Further, the upstream side seal ring 40 is externally fitted to the reduced diameter portion 30 in a loosely fitted state so that the upstream side seal ring 40 is movable in the axial direction (front-back direction) within the range of the reduced diameter portion 30. Furthermore, the through-hole of the upstream side seal ring 40 is formed with a tapered portion 42 which has a tapered surface (contact surface) and an annular portion 43 which has a diameter larger than the diameter of a cylindrical portion 32. Moreover, cutouts 47, which are engageable with the projections 34a provided on the end surface 34 of the second screw portion 20b, are formed at a plurality of positions in the circumferential direction on a downstream side ring surface 46 of the upstream side seal ring 40.

Accordingly, in the same manner as the downstream side seal mechanism S2, when the upstream side seal ring 40 is moved to the downstream side with respect to the screw 20, then the tapered surface of the truncated cone portion 31 is separated from the tapered surface of the tapered portion 42, and the gap G is opened between the inner circumferential surface of the upstream side seal ring 40 and the outer circumferential surface of the reduced diameter portion 30. On the other hand, when the upstream side seal ring 40 is moved to the upstream side with respect to the screw 20, then the tapered surface of the truncated cone portion 31 abuts against the tapered surface of the tapered portion 42, and the gap G is closed between the inner circumferential surface of the upstream side seal ring 40 and the outer circumferential surface of the reduced diameter portion 30. Further, when the projections 34a and the cutouts 47 are engaged with each other, then the upstream side seal ring 40 corotates together with the screw 20.

Next, an explanation will be made about an operation of the above-described seal mechanisms S1, S2 in accordance with steps performed by the kneading apparatus 200. As depicted in FIG. 3, when the screw 20 is rotated forwardly (counterclockwise), the upstream side and downstream side seal rings 40, 60 are moved to the downstream side within the ranges of the reduced diameter portions 30, 50 respectively. Accordingly, the tapered surface of the truncated cone portion 31 and the tapered surface of the tapered portion 42 are separated from each other, the gap G is opened between the inner circumferential surface of the upstream side seal ring 40 and the outer circumferential surface of the reduced diameter portion 30 of the screw 20, and the plasticizing zone 21 and the high pressure kneading zone 22 are communicated with each other. When the projections 34a and the cutouts 47 are engaged with each other, the upstream side seal ring 40 corotates together with the screw 20. Accordingly, the communicated state is maintained between the plasticizing zone 21 and the high pressure kneading zone 22. Therefore, the molten resin can be smoothly fed from the plasticizing zone 21 to the high pressure kneading zone 22.

When a certain amount (predetermined amount) of the molten resin is fed to the high pressure kneading zone 22, then as depicted in FIG. 4, the screw 20 is reversely rotated (clockwise) at a number of revolutions of not less than a predetermined number of revolutions by the screw rotation driving mechanism. Accordingly, the upstream side and downstream side seal rings 40, 60 are moved to the upstream side in accordance with the reverse rotation of the screw 20. Therefore, the tapered surfaces of the truncated cone portions 31, 51 abut against the tapered surfaces of the tapered portions 42, 62; and the gaps G, which have been formed between the inner circumferential surfaces of the upstream side and downstream side seal rings 40, 60 and the outer circumferential surfaces of the reduced diameter portions 30, 50, are closed. When the projections 34a, 54a of the screw 20 are engaged with the cutouts 47, 67 of the upstream side and downstream side seal rings 40, 60, the upstream side and downstream side seal rings 40, 60 corotate together with the screw 20. Accordingly, the disconnected (shut off) state is maintained between the high pressure kneading zone 22 and the pressure reduction zone 23. Therefore, even when the high pressure physical foaming agent is introduced into the high pressure kneading zone 22, the molten resin and the physical foaming agent are prevented from flowing into the adjoining zones 21, 23 from the high pressure kneading zone 22. Thus, the molten resin and the physical foaming agent can be brought in contact and kneaded with each other at a high pressure.

When the high pressure kneading zone 22 and the adjoining zones 21, 23 are sealed by the upstream side and downstream side seal mechanisms S1, S2 and the molten resin and the physical foaming agent are brought in contact and kneaded with each other, the screw 20 is subsequently rotated forwardly again by the screw rotation driving mechanism in order to lower the resin internal pressure of the molten resin. Accordingly, the projections 34a, 54a are disengaged from the cutouts 47, 67, and the upstream side and downstream side seal rings 40, 60 are moved to the downstream side in accordance with the forward rotation of the screw 20. Therefore, the tapered surfaces of the truncated cone portions 31, 51 are separated from the tapered surfaces of the tapered portions 42, 62, and the gaps G are opened between the inner circumferential surfaces of the upstream side and downstream side seal rings 40, 60 and the outer circumferential surfaces of the reduced diameter portions 30, 50. Accordingly, the high pressure kneading zone 22 and the pressure reduction zone 23 are communicated with each other, and the resin internal pressure of the molten resin is lowered. Therefore, the gasified physical foaming agent (gasified portion of the physical foaming agent) is separated from the molten resin, and the gasified physical foaming agent can be discharged from the vent 203 provided in the pressure reduction zone 23. As described above, the downstream side seal ring 60 receives the pressure from the molten resin and the physical foaming agent after the molten resin and the physical foaming agent are brought in contact and kneaded with each other in the high pressure kneading zone 22. Therefore, the high pressure kneading zone 22 and the pressure reduction zone 23 can be communicated with each other as well by stopping the rotation of the screw 20 or lowering the number of the reverse rotation of the screw 20.

As described above, in this embodiment, the contact and kneading of the physical foaming agent with the molten resin and the separation of the physical foaming agent from the molten resin can be also repeatedly performed in a state that the molten resin is allowed to stay in the high pressure kneading zone 22. For example, the following operation may be performed. Namely, the number of revolutions of the screw 20 is controlled in a state that the molten resin is not fed frontwardly while reversely rotating the screw 20, the tapered surface of the truncated cone portion 51 and the tapered surface of the tapered portion 62 are separated from each other, and thus the gap G is slightly opened. Accordingly, the physical foaming agent can be brought in contact with the molten resin in the high pressure kneading zone 22 again, and the physical foaming agent can be further introduced into the molten resin. Furthermore, in a case that the pressure of the high pressure kneading zone 22 is higher than the resin internal pressure in the plasticizing zone 21, the upstream side seal mechanism S1 is easily movable in the direction in which the plasticizing zone 21 and the high pressure kneading zone 22 are disconnected (shut off) from each other. Therefore, any renewed flow of the molten resin, which is directed from the plasticizing zone 21 to the high pressure kneading zone 22, is suppressed. Further, it is also possible to avoid any leakage of the physical foaming agent to the plasticizing zone 21.

<Molding Method>

Next, an explanation will be made about a foam injection molding method (production method for producing a foamed molded product) of the embodiment, in accordance with a flow chart illustrated in FIG. 1. At first, a thermoplastic resin is supplied to the plasticizing cylinder 210, and the screw 20 is rotated. Accordingly, the thermoplastic resin is plasticized in the plasticizing zone 21 to provide a molten resin (Step S1).

Various resins can be used as the thermoplastic resin depending on the type of the objective molded product (product to be molded). Specifically, it is possible to use, for example, thermoplastic resins including, for example, polypropylene, polymethyl methacrylate, polyamide, polycarbonate, amorphous polyolefin, polyether imide, polyethylene terephthalate, polyether ether ketone, ABS-based resin, polyphenylene sulfide, polyamide imide, polylactic acid, and polycaprolactone, and composite materials thereof. Further, it is also possible to use those obtained by kneading various inorganic fillers such as glass fiber, talc, carbon fiber and the like with the thermoplastic resin as described above.

Subsequently, the plasticized molten resin is successively fed from the plasticizing zone 21 to the high pressure kneading zone 22 in accordance with the forward rotation of the screw 20, and the communication between the high pressure kneading zone 22 and the pressure reduction zone 23 is shut off by the downstream side seal mechanism S2 (Step S2). In this embodiment, the upstream side seal mechanism 51 is simultaneously used to perform the disconnection between the plasticizing zone 21 and the high pressure kneading zone 22 as well. Further, the physical foaming agent is introduced into the high pressure kneading zone 22, and the molten resin and the physical foaming agent are brought in contact and kneaded with each other in the high pressure kneading zone 22 (Step S3). In the kneading apparatus 200 of this embodiment, the molten resin and the physical foaming agent can be brought in contact and kneaded with each other in the state that the communication between the high pressure kneading zone 22 and the adjoining zones 21, 23 is shut off by the upstream side and downstream side seal mechanisms S1, S2. Therefore, the leakage of the physical foaming agent from the high pressure kneading zone 22 is suppressed, and the physical foaming agent can be introduced into the molten resin while maintaining the high pressure state. The pressure and the temperature of the high pressure kneading zone 22, which are to be provided upon the contact and kneading, can be appropriately selected within a range in which the physical foaming agent is satisfactorily dispersed in the molten resin, depending on the types of the thermoplastic resin and the physical foaming agent to be used.

As for the physical foaming agent, it is preferable to use pressurized fluid such as pressurized nitrogen or pressurized carbon dioxide. The above-described physical foaming agents are harmless to the human body, excellent in the dispersibility in the molten resin, and easily removable from the molten resin. Further, each of the physical foaming agents functions as a plasticizer for the molten resin. The introducing pressure and the temperature of the physical foaming agent to the plasticizing cylinder 210 are different depending on the kinds or types of the physical foaming agent, and the introducing pressure and the temperature of the physical foaming agent to be introduced into the plasticizing screw 210 are arbitrary. However, it is preferable to use the physical foaming agent in a liquid state or in a supercritical state, because the density is high and the state is stable. In a case that pressurized nitrogen or pressurized carbon dioxide is used as the physical foaming agent, it is preferable that the pressure of pressurized nitrogen or pressurized carbon dioxide is in a range of 3 MPa to 25 MPa and the temperature of pressurized nitrogen or pressurized carbon dioxide is in a range of 10° C. to 100° C. In a case that the pressure is not less than 3 MPa, the physical foaming agent can be stably introduced into the plasticizing cylinder 210. In a case that the pressure is not more than 25 MPa, the load on the apparatus is decreased. Further, in a case that the temperature is within the range of 10° C. to 100° C., the physical foaming agent is easily controlled in the system. As for pressurized nitrogen and pressurized carbon dioxide used as the physical foaming agent in this embodiment, the temperature instantaneously becomes high in the plasticizing cylinder 210, and the pressure varies or fluctuates as well. Therefore, the state, the temperature, and the pressure of the physical foaming agent described above correspond to the values of the state, the pressure, and the temperature of the physical foaming agent in the stable state before being introduced into the plasticizing cylinder 210.

In this embodiment, pressurized carbon dioxide is used as the physical foaming agent, and a functional material is further contained in pressurized carbon dioxide. In a case that the functional material is contained, it is preferable that pressurized carbon dioxide is used as the physical foaming agent. In the following description, the physical foaming agent containing the functional material is referred to as "mixture pressurized fluid", if necessary.

The functional material is not specifically limited, provided that the functional material can be dissolved or dispersed in the physical foaming agent and the functional material can apply a predetermined function to the obtained molded product. The functional material as described above is exemplified, for example, by organic metal complexes, inorganic particles such as metal alkoxide or the like or precursors thereof, carbon fibers, inorganic fillers such as glass fibers or modified compounds thereof, compatibility-providing agents for facilitating alloy formation of various resins, surfactants, dyes, nanocarbon, antistatic agents, incombustible materials (refractory materials), and the like. The concentration of the functional material in the physical foaming agent can be appropriately selected in consideration of the type of the functional material to be used and the function of the objective molded product, which is not specifically limited. However, the concentration is preferably not more than the saturated solubility in consideration of the permeation performance into the molten resin and the aggregation of the functional material in the physical foaming agent. In particular, the density of the physical foaming agent is suddenly lowered in the plasticizing cylinder of the molding machine having a high temperature. Therefore, the concentration of the functional material in the physical foaming agent is preferably in a range of about 1% to about 50% of the saturated solubility.

The physical foaming agent itself functions as a plasticizer for the molten resin even at a low pressure. However, in order to facilitate the plasticizing effect, it is also appropriate to use a plasticizer and various solvents such as alcohol and the like. The physical foaming agent may further contain a solvent. For example, it is possible to use the physical foaming agent which is obtained as an emulsified liquid (emulsion) by using water together with the physical foaming agent and a water-soluble surfactant. The material, which is dissolvable in the physical foaming agent, is limited. Therefore, by using the solvent as described above, a water-soluble material can be introduced into the molten resin by utilizing the compatibility and the dispersibility with respect to the resin possessed by the physical foaming agent. If only water is brought in contact and kneaded with the molten resin, it is feared that any harmful influence such as hydrolysis or the like may be caused by water remaining in the molded product. However, in a case that water is introduced into the molten resin in a form of emulsion together with the physical foaming agent, the water can be quickly separated from the molten resin together with the physical foaming agent, and it is possible to avoid the harmful influence as described above. Further, the physical foaming agent may contain a solvent which dissolves the functional material. For example, in a case that an organic metal complex is used, a fluorine-based organic solvent such as perfluoropentylamine or the like may be used in order to raise the concentration of the organic metal complex in the mixture pressurized fluid.

The method for preparing the physical foaming agent is not specifically limited, and it is possible to use any conventionally known method. For example, the physical foaming agent can be prepared by pressurizing any liquid physical foaming agent by any pressurizing means such as a syringe pump or the like. In a case that the physical foaming agent containing the functional material (mixture pressurized fluid) is prepared, the physical foaming agent containing the functional material (mixture pressurized fluid) can be prepared by mixing and agitating the physical foaming agent and the functional material. Further, in a case that a solution in which the functional material is dissolved in a solvent is used, the mixture pressurized fluid can be prepared by mixing the physical foaming agent with the solution pressurized to a predetermined pressure by any pressurizing means.

Any arbitrary method can be used as the method for supplying the mixture pressurized fluid to the high pressure kneading zone 22. For example, the mixture pressurized fluid may be intermittently introduced into the high pressure kneading zone 22, or the mixture pressurized fluid may be continuously introduced into the high pressure kneading zone 22. In a case that the mixture pressurized fluid is introduced, it is preferable that a syringe pump, which makes it possible to perform the stable liquid feeding, is utilized to control the amount of introduction. In a case that the mixture pressurized fluid is introduced by using the syringe pump, a mixture pressurized fluid, which is in a stable liquid state even in the case of a high density, is preferably used.

As will be described later on, in this embodiment, the pressure of the pressure reduction zone 23 is adjusted by the pressure reduction zone pressure adjusting mechanism 219. With this, the concentration of the physical foaming agent in the molten resin is controlled before the injection. Therefore, the control is performed in relation to the concentration of the physical foaming agent in the molten resin in the later or following step. Thus, in a case that any functional material is not contained in the physical foaming agent, it is also allowable that the amount of introduction of the physical foaming agent is not strictly controlled at the stage of introduction into the high pressure kneading zone 22. Further, as will be explained specifically later on, in this embodiment, the concentration of the physical foaming agent in the molten resin can be allowed to approach the saturated solubility; therefore, it is also unnecessary that the physical foaming agent, which is to be introduced into the molten resin, has an unnecessarily high pressure. In the case of any conventional foam injection molding method, a high pressure physical foaming agent is measured to quantitatively supply the same into the plasticizing cylinder. Therefore, the apparatus is complicated and the cost is increased, which hinders the widespread use of the foam injection molding. In contrast, in the injection molding method of this embodiment, the physical foaming agent in the bomb 151 may be directly introduced into the plasticizing cylinder 210 without being pressurized and without performing the flow rate control, for example, as in a physical foaming agent supplying apparatus 400 depicted in FIG. 10. By using the physical foaming agent supplying apparatus 400 having no pressurizing unit or apparatus as described above, it is possible to realize the low cost of the entire molding machine.

On the other hand, when the high pressure kneading zone 22 and the pressure reduction zone 23 are disconnected from each other, the pressure of the pressure reduction zone 23 is controlled to be a pressure (first pressure) which is not less than the atmospheric pressure and is not more than the maximum pressure of the high pressure kneading zone 22 which is achieved when the physical foaming agent is brought in contact and kneaded with the molten resin (Step S4). When the physical foaming agent is introduced into the high pressure kneading zone 22, the pressure is raised. In this context, the term "maximum pressure" means the maximum (highest) pressure (maximum achieved pressure or maximum reached pressure) of the high pressure kneading zone 22 as achieved or reached during a period in which the physical foaming agent is brought in contact and kneaded with the molten resin.

In this embodiment, the pressure reduction zone pressure adjusting mechanism 219 controls the pressure of the pressure reduction zone 23 to be the pressure which is not less than the atmospheric pressure and which is not more than the maximum pressure (highest pressure) of the high pressure kneading zone 22 which is achieved when the physical foaming agent is brought in contact and kneaded with the molten resin. By doing so, the amount of the physical foaming agent introduced into the plasticizing cylinder 210 can be stably controlled for each shot. The reason therefor will be explained in the following with reference to FIGS. 8 and 9, while comparing with the conventional kneading apparatus.

Figure 9:
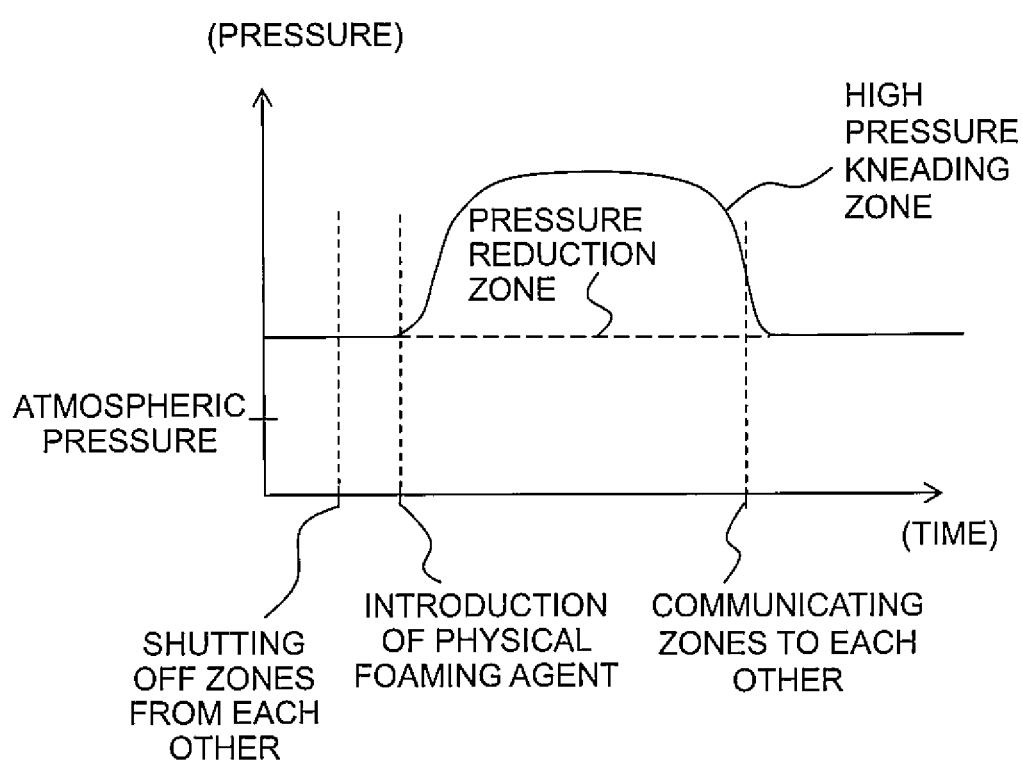
FIG. 9 is a view illustrating a time-dependent change of the pressure in a high pressure kneading zone and a pressure reduction zone in a plasticizing cylinder of the embodiment.

As described above, when the physical foaming agent is introduced into the high pressure kneading zone 22, the high pressure kneading zone 22 is disconnected from the pressure reduction zone 23. As depicted in FIG. 9, by introducing the physical foaming agent after disconnecting the high pressure kneading zone 22 from the pressure reduction zone 23, the pressure of the high pressure kneading zone 22 is raised. After a predetermined period of time elapses, the high pressure kneading zone 22 is communicated with the pressure reduction zone 23 again. By doing so, the pressure of the high pressure kneading zone 22 is lowered to the pressure of the pressure reduction zone 23. The cycle, in which the pressure of the high pressure kneading zone 22 is raised and lowered, is repeated for every shot.

In the conventional physical foaming molding method, such a screw has been used that the resin pressure is transmitted from the forward end portion of the screw to the position at which the high pressure physical foaming agent such as a supercritical fluid or the like is introduced. Further, the resin internal pressure of the introducing portion at which the high pressure physical foaming agent is introduced is controlled by the back pressure of the screw (screw back pressure), assuming that all of the screw back pressure, the pressure of the molten resin deposited at the forward end of the screw, and the pressure of the molten resin disposed at the introducing portion of the high pressure physical foaming agent are equal to one another. However, the resin internal pressure at the introducing portion of the high pressure physical foaming agent is actually different from the screw back pressure, for example, because the physical foaming agent is not kneaded at a uniform concentration over the entire screw. Therefore, the amount of introduction of the high pressure physical foaming agent into the plasticizing cylinder has been varied or fluctuated.

Figure 8:
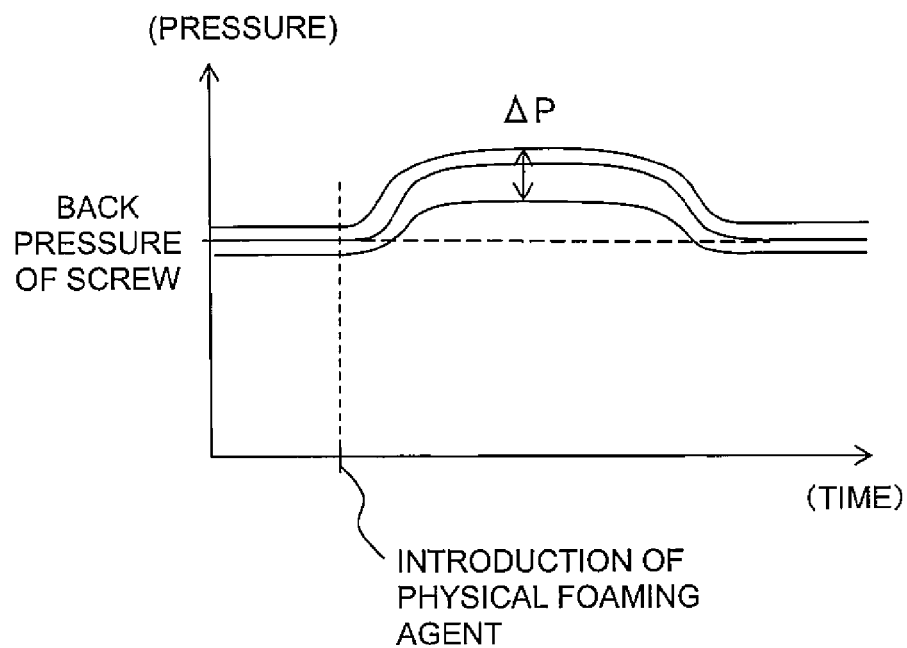
FIG. 8 is a view illustrating a time-dependent change of the pressure in a plasticizing cylinder used in a conventional foam injection molding method.

As depicted in FIG. 8, in the conventional technique, the amount of introduction of the physical foaming agent is measured to introduce the physical foaming agent into the plasticizing cylinder, and the screw back pressure is raised to decrease the differential pressure with respect to the pressure of introduction of the physical foaming agent. However, the achieved pressure fluctuates for every shot. FIG. 8 depicts the fluctuation of the achieved pressure by "ΔP". It is presumed that FIG. 8 depicts that the amount of the physical foaming agent actually introduced into the plasticizing cylinder fluctuates for every shot, because the resin density and the pressure are fluctuated in the plasticizing cylinder on the receiving side.

In this embodiment, the pressure in the pressure reduction zone 23, which is provided when the communication between the high pressure kneading zone 22 and the pressure reduction zone 23 is shut off, is controlled by the pressure reduction zone pressure adjusting mechanism 219 so that the pressure is not less than the atmospheric pressure and the pressure is not more than the maximum pressure of the high pressure kneading zone 22 which is achieved when the physical foaming agent is brought in contact and kneaded with the molten resin. The pressure reduction zone pressure adjusting mechanism 219 can directly control the pressure in the pressure reduction zone 23, and thus the pressure reduction zone pressure adjusting mechanism 219 can also control the pressure kneading zone 22 before the pressure increase to have the same pressure. In other words, the pressure reduction zone pressure adjusting mechanism 219 controls the high pressure kneading zone 22 and the pressure reduction zone 23 to have a constant pressure when the high pressure kneading zone 22 and the pressure reduction zone 23 are communicated with each other. The control is performed with the pressure of the gas having the viscosity which is extremely lower than that of resin as provided in the molten state. Therefore, the pressure at the communication portion can be instantaneously controlled to be constant. As a result, as depicted in FIG. 9, the achieved pressure in every shot, i.e., the amount of introduction of the physical foaming agent can be made approximately constant. In particular, in this embodiment, since the physical foaming agent contains the functional material, the amount of introduction of the functional material can also be constant at the same time by making the amount of introduction of the physical foaming agent to be constant.

It is necessary that the resin density should not be excessively increased in order that the pressures of the high pressure kneading zone 22 and the pressure reduction zone 23 are identical with each other during the communication. For example, if the flow resistance of the molten resin is large in the high pressure kneading zone 22 and the resin density is excessively raised, for example, on account of the shallow depth of the flight (groove) of the screw, then the easiness of passage of the gas is inhibited at the communication portion. For this reason, the pressure of the high pressure kneading zone 22 becomes higher than the gas pressure of the pressure reduction zone 23 in some cases during the communication. Even in such a situation, the foam molding can be performed at a low pressure. However, in view of the stability of the pressure, it is desirable that the difference in the internal pressure between the high pressure kneading zone 22 and the pressure reduction zone 23 is suppressed to be within 2 MPa during the communication.

The pressure in the pressure reduction zone 23, which is provided when the pressure reduction zone 23 is shut off from the high pressure kneading zone 22, is not specifically limited, provided that the pressure is not less than the atmospheric pressure and the pressure is not more than the maximum pressure of the high pressure kneading zone 22 which is achieved when the physical foaming agent is brought in contact and kneaded with the molten resin. The reason, why the pressure of the pressure reduction zone 23 is not less than the atmospheric pressure, is as follows. Namely, if the pressure is less than the atmospheric pressure, the gasified physical foaming agent is to be forcibly discharged. It is feared that the molten resin may cause the vent up. Further, in this situation, any equipment such as a vacuum pump or the like is required, and hence the high cost is required. On the other hand, the reason, why the pressure of the pressure reduction zone 23 is not more than the maximum achieved pressure of the high pressure kneading zone 22, is as follows. Namely, it is intended that the physical foaming agent is introduced smoothly, and the molten resin to which the physical foaming agent is introduced is subjected to the pressure reduction so that the physical foaming agent is gasified and separated from the molten resin. It is preferable that the pressure in the pressure reduction zone 23 is in a range of 0.5 MPa to 6 MPa. In a case that the pressure in the pressure reduction zone 23 is not less than 0.5 MPa, then it is possible to decrease the differential pressure with respect to the physical foaming agent introduced into the high pressure kneading zone 22, and it is possible to suppress the pressure fluctuation associated with the communication and the disconnection between the zones. Further, in a case that the pressure in the pressure reduction zone is not more than 6 MPa, it is possible to avoid such a situation that the functional material is discharged together with the physical foaming agent in a state of being dissolved in the physical foaming agent. On the other hand, for example, in a case that the functional material is modified (changed in quality) due to, for example, the thermal decomposition and/or the dehydration condensation reaction in the plasticizing cylinder 210, and the functional material becomes insoluble in the solvent and pressurized carbon dioxide as the physical foaming agent, then it is not feared that the functional material might be discharged together with the physical foaming agent. Therefore, the pressure in the pressure reduction zone 23, which is provided when the communication between the high pressure kneading zone 22 and the pressure reduction zone 23 is shut off or blocked, may be set to have a relatively high value, i.e., a value in a range of 6 MPa to 20 MPa. Further, it is preferable that the pressure in the pressure reduction zone 23, which is provided when the communication between the high pressure kneading zone 22 and the pressure reduction zone 23 is shut off or blocked, is controlled to be a constant pressure, in view of further stabilizing the pressure in the plasticizing cylinder 210.

In this embodiment, as an additional effect, the concentration of the physical foaming agent in the molten resin can be allowed to approach the saturated solubility. As for the saturated solubility (saturated concentration) of pressurized nitrogen or pressurized carbon dioxide to serve as the physical foaming agent with respect to the molten resin, the higher the pressure is, the higher the saturated solubility (saturated concentration) is; whereas the lower the pressure is, the lower the saturated solubility (saturated concentration) is. Therefore, when the pressure of the molten resin is reduced to be not more than the maximum pressure which is achieved during the contact and kneading after allowing the physical foaming agent to be brought in contact and kneaded with the molten resin while maintaining the high pressure state as described above, then the saturated solubility is also lowered as the pressure is lowered. Therefore, the concentration of the physical foaming agent can be allowed to approach the saturated solubility without raising the absolute amount of the physical foaming agent in the resin. In this procedure, any excessive or surplus physical foaming agent, which is contained in the molten resin, is gasified and separated from the molten resin, and the excessive physical foaming agent is discharged from the pressure reduction zone 23. Even when the physical foaming agent is introduced in an excessive amount, the physical foaming agent is brought in contact and kneaded with the molten resin, while the surplus physical foaming agent is separated from the molten resin, and the surplus physical foaming agent is discharged from the pressure reduction zone 23. Therefore, a merit is obtained such that a large amount of the physical foaming agent can be kneaded in the high pressure kneading zone 22 as compared with any conventional method.

The phrase that "the concentration of the physical foaming agent in the molten resin approaches the saturated solubility" means that in a case that the ratio of the actual concentration of the physical foaming agent with respect to the saturated solubility of the physical foaming agent in the molten resin in the state provided before controlling the pressure is compared with the ratio of the actual concentration of the physical foaming agent with respect to the saturated solubility of the physical foaming agent in the molten resin in the state provided after controlling the pressure, the ratio of the actual concentration of the physical foaming agent with respect to the saturated solubility in the state provided after controlling the pressure is higher than that in the state provided before controlling the pressure.

The molten resin, in which the physical foaming agent is contained at a high concentration approximate to the saturated solubility, arrives at the supersaturation in a high pressure region when the molten resin is injected and charged into the mold, wherein many foaming nuclei are generated or produced. Accordingly, it is possible to raise the foaming density of the foamed molded product. Further, after the physical foaming agent has been introduced into the molten resin, the concentration of the physical foaming agent in the molten resin is controlled before the injection of the physical foaming agent into the mold. Therefore, it is also allowable that the amount of introduction of the physical foaming agent into the molten resin is not strictly controlled.

Further, the embodiment also achieve an effect of suppressing the phase separation between the molten resin and the physical foaming agent. In the conventional foam injection molding method, the pressure of the molten resin after having been brought in contact with and kneaded with the physical foaming agent is lowered (controlled) by the screw back pressure. However, in this case, the resin and the gas as the physical foaming agent undergo the phase separation in some cases. On the other hand, the embodiment controls both of the pressure of the molten resin and the gas pressure of the physical foaming agent around or surrounding the molten resin at the same time by controlling the pressure in the pressure reduction zone 23, thereby suppressing the phase separation between the resin and the physical foaming agent. Further, according to the embodiment, the physical foaming agent, separated from the molten resin during the contact and kneading with the molten resin, can be discharged in advance in the pressure reduction zone 23; the phase separation between the molten resin and the physical foaming agent can be suppressed also by feeding, in the forward direction, only the molten resin in a uniform compatibly dissolve state wherein the physical foaming agent is uniformly and compatibly dissolved in the molten resin.

Subsequently, the high pressure kneading zone 22 and the pressure reduction zone 23 are communicated with each other (Step S5 in FIG. 1) to lower the resin internal pressure of the molten resin which has been brought in contact and kneaded with the physical foaming agent, and thus the excessive physical foaming agent (a portion of the introduced physical foaming agent) is gasified and separated from the molten resin (Step S6). Since this embodiment uses the downstream side seal mechanism S2 which makes communication between the high pressure kneading zone 22 and the pressure reduction zone 23 in accordance with the rotation state of the screw 20, the excessive physical foaming agent introduced into the molten resin can be quickly gasified without depending on the pressure of the high pressure kneading zone 22, and the gasified physical foaming agent can be discharged to the outside of the plasticizing cylinder 210.

When the excessive physical foaming agent which has been gasified is separated from the molten resin, the physical foaming agent may be separated while feeding the molten resin to the pressure reduction zone 23. Alternatively, the physical foaming agent may be separated in such a state that the molten resin is allowed to stay in the high pressure kneading zone 22. Namely, in the kneading apparatus 200 of this embodiment, the downstream side seal mechanism S2 is provided, which makes communication and disconnection between the high pressure kneading zone 22 and the pressure reduction zone 23 in accordance with the rotation state of the screw 20. Therefore, even when the molten resin is not fed to the pressure reduction zone 23, the resin internal pressure of the molten resin can be lowered in the state that the molten resin is allowed to stay in the high pressure kneading zone 22 on condition that the high pressure kneading zone 22 and the pressure reduction zone 23 are communicated with each other, thereby gasifying a part or portion of the physical foaming agent in the high pressure kneading zone 22, thus making it possible to discharge the gasified physical foaming agent from the pressure reduction zone 23. For example, the following procedure appropriately performed. Namely, the number of revolutions of the screw 20 is controlled in a state that the molten resin is not fed frontwardly while reversely rotating the screw 20, to thereby separate the tapered surface of the truncated cone portion 51 and the tapered surface of the tapered portion 62 from each other, and thus allowing the gap G to be slightly opened. By doing so, the physical foaming agent can be brought in contact again with the molten resin in the high pressure kneading zone 22 in which the concentration of the physical foaming agent has been lowered, and the physical foaming agent can be further introduced into the molten resin. Further, in a case that the pressure of the high pressure kneading zone 22 is higher than the resin internal pressure in the plasticizing zone 21, the upstream side seal mechanism S1 is easily moved in the direction in which the plasticizing zone 21 and the high pressure kneading zone 22 are disconnected from each other. Therefore, any new flow of the molten resin, which is directed from the plasticizing zone 21 to the high pressure kneading zone 22, is suppressed, and it is also possible to avoid the leakage of the physical foaming agent to the plasticizing zone 21. Therefore, according to the production method using the kneading apparatus 200 of this embodiment, the kneading step and the separating step can be repeatedly performed in the state that the molten resin is allowed to stay in the high pressure kneading zone 22. Accordingly, for example, it is possible to obtain a thermoplastic resin molded product in which the functional material is dispersed at a high concentration even in the case of a functional material having a low solubility in the physical foaming agent (pressurized carbon dioxide). In this procedure, as described above, the forward rotation and the reverse rotation of the screw 20 may be repeated bit by bit (at short intervals) in order to repeat the communication and the disconnection between the high pressure kneading zone 22 and the pressure reduction zone 23. Alternatively, it is also allowable to repeat, bit by bit, the reverse rotation of the screw 20 at a number of revolutions of not less than a predetermined number of revolutions and the stop of the rotation of the screw 20 or the decrease in the number of the reverse rotation of the screw 20. The physical foaming agent in an excessive amount can be also dissolved continuously while applying the screw shearing, while increasing/decreasing the pressure of the high pressure kneading zone 22 by repeating the communication and the disconnection between the high pressure kneading zone 22 and the pressure reduction zone 23 while continuously introducing the physical foaming agent.

In this embodiment, when separating the gasified physical foaming agent from the molten resin, the temperature of the pressure reduction zone 23 can be controlled to be lower than those of the other zones different from the pressure reduction zone 23. With this, the viscosity of the molten resin is raised and the vent up can be suppressed. The main cause or factor of the vent up is considered as follows. Namely, when the molten resin is brought in contact and kneaded with the physical foaming agent, the viscosity of the molten resin is in a lowered state, and when the molten resin having the lowered viscosity is subjected to a sudden pressure reduction for the purpose of gas discharge, the resin undergoes the volume expansion. In the embodiment, the pressure reduction zone 23 is cooled so as to change the state of the molten resin to a semi-solidified state, thereby making it possible to suppress the vent up.

As a method for cooling the pressure reduction zone 23, it is allowable to provide a temperature adjusting mechanism such as a cooling mechanism, etc., on the pressure reduction zone 23. In the embodiment, a cooling jacket (not depicted) is provided as the cooling mechanism around the pressure reduction zone 23 of the plasticizing cylinder 210. The temperature difference between the pressure reduction zone and the other zones is arbitrary, because the proper value changes depending on the resin type and/or the viscosity change brought about when the physical foaming agent is contained. However, it is preferable that the temperature difference is within a range of 10° C. to 100° C. For example, it is preferable that the plasticizing zone 21, the high pressure kneading zone 22, and the remelting zone 24 of the plasticizing cylinder are controlled to be a temperature in a range of 240° C. to 280° C. by the band heater, and the pressure reduction zone 23 is controlled to be a temperature in a range of 190° C. to 230° C. by the cooling jacket. The cooling mechanism is not limited to the cooling jacket; any cooling mechanism may be provided for the pressure reduction zone pressure adjusting mechanism 219, and the pressure reduction zone may be cooled thereby. In this case, the pressure reduction zone pressure adjusting mechanism 219 also has the function to control the temperature together with the pressure of the pressure reduction zone 23. For example, the following form or arrangement is available. Namely, a water conduction hole, which allows cooling water to flow therethrough, is provided at a portion, of the buffer container 5 of the pressure reduction zone pressure adjusting mechanism 219, the portion being located at a lower portion of the buffer container 5 and brought in contact with the pressure reduction zone 23, so that water is always allowed to flow. Accordingly, the upper surface of the plasticizing cylinder 210 in the pressure reduction zone 23 can be cooled as compared with the ambient plasticizing cylinder temperature. For example, water having a low temperature of about 30° C. can be used as water allowed to flow.

Further, the buffer container 5 of the pressure reduction zone pressure adjusting mechanism 219 of the molding machine 1000 may function as a resin trap when the vent up is caused. The buffer container 5 has a lower portion which is connected to the vent 203 and an upper opening which is closed by a lid 6. An arm, which extends to the interior of the buffer container 5 when the lid 6 closes the buffer container 5, is provided at a lower portion of the lid 6. A filter 9, through which only the gas is permeated, is connected to the forward end of the arm. As depicted in FIG. 2, the gas discharge mechanism 1 and the pressurizing mechanism 2 of the pressure reduction zone pressure adjusting mechanism 219 are connected to the buffer container 5 by pipings. When the buffer container 5 is closed by the lid 6, the connection ports 5a, 5b of the gas discharge mechanism 1 and the pressurizing mechanism 2 are positioned on the side of (to be closer to) the lid 6 as compared with the filter 9. Owing to the construction provided as described above, when the vent up of the molten resin is caused from the vent 203, then the molten resin is trapped by the buffer container 5, and the molten resin is blocked by the filter 9, wherein the molten resin does not invade beyond the filter 9 to a location on the side of (to be closer to) the lid 6. Therefore, it is not feared that the molten resin might enter the pipings from the connection ports 5a, 5b of the gas discharge mechanism 1 and the pressurizing mechanism 2 and might clog up the pipings. Further, since the lid 6 and the filter 9 are detachable from the container 5, any resin subjected to the vent up can be removed, and the container 5, the lid 6, and the filter 9 can be washed or cleaned with ease as well. The use of the buffer container 5 which functions as the resin trap as described above is effective especially in the process for determining the driving condition of the kneading apparatus 200.

Further, in the embodiment, as depicted in FIGS. 3 and 4, at least a part or portion of the flat portion 20B of the screw 20 may be located in the pressure reduction zone 23 when the physical foaming agent is discharged. As described above, in this embodiment, the temperature of the pressure reduction zone 23 is controlled to be lower than those of the other zones in order to suppress the vent up of the molten resin; the viscosity of the molten resin is raised, and the molten resin is in the semi-solidified state. The flight of the screw is originally provided for the screw in order to move the molten resin having a low viscosity, and thus the flight rather hinders the movement of the molten resin with respect to the molten resin having the high viscosity as described above. In this embodiment, the screw 20 (20B), which is positioned in the pressure reduction zone 23, has no flight. Therefore, the resin in the semi-solidified state is wound around the entire outer circumference of the flat portion 20B of the screw 20. Further, the resin is extruded by the molten resin disposed therebehind, and the resin is moved to the remelting zone 24 disposed on the downstream.

When the excessive or surplus physical foaming agent is gasified and separated from the molten resin, the molten resin is fed to the remelting zone 24 positioned on the downstream from the pressure reduction zone 23. In this embodiment, the resin in the semi-solidified state is heated and remelted in the remelting zone 24.

Figure 1:
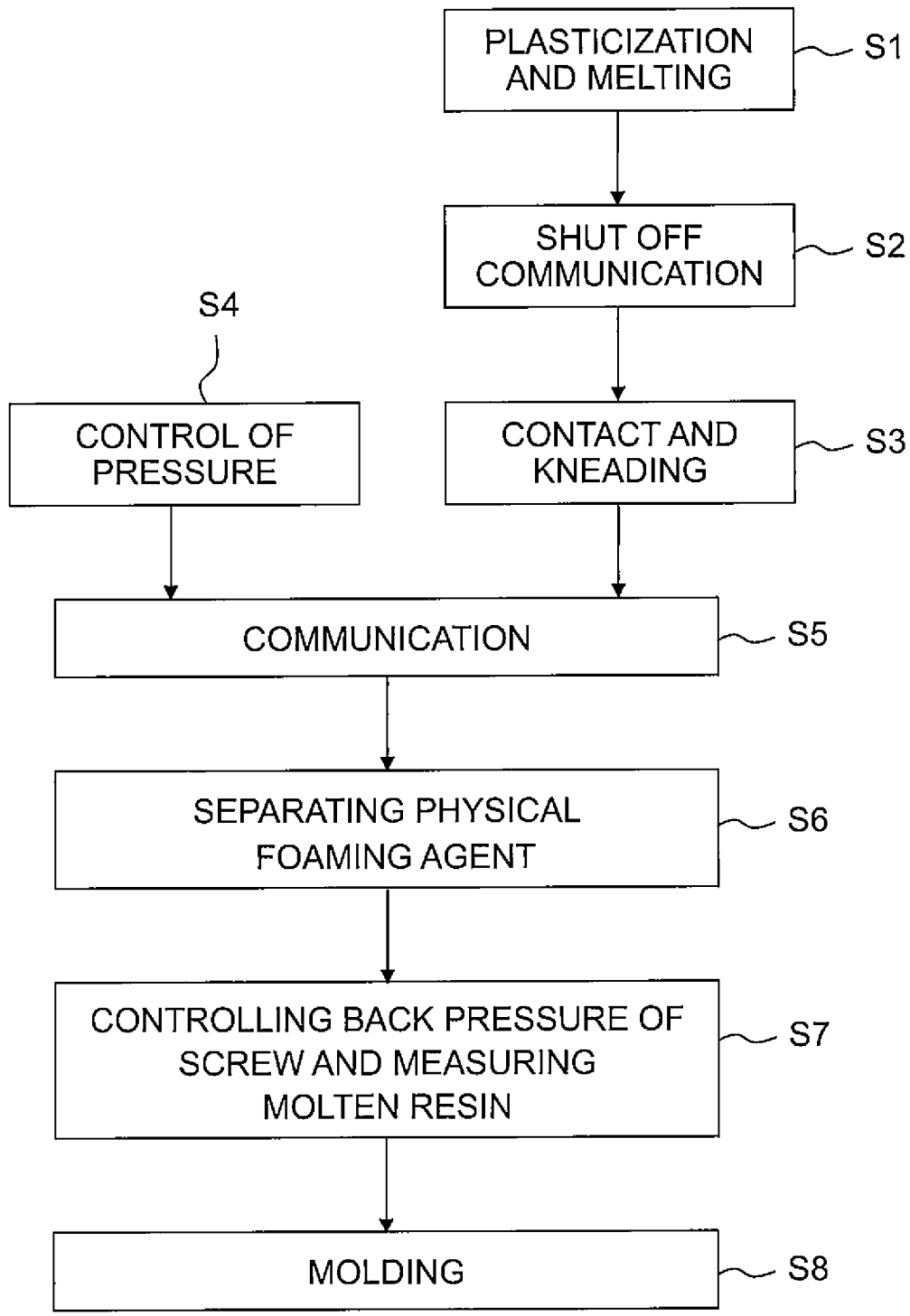
FIG. 1 is a flow chart indicating a method for producing a foamed molded product of an embodiment of the present teaching.

Next, the screw back pressure is controlled to be a pressure (second pressure) not less than the pressure (first pressure) of the pressure reduction zone 23, and a predetermined amount of the molten resin from which the gasified physical foaming agent has been separated is measured (step S7 in FIG. 1). In this embodiment, the high pressure kneading zone 22 and the pressure reduction zone 23 located on the downstream side of the high pressure kneading zone 22 can be shut off from each other by the downstream side seal mechanism S2, and further the pressure of the pressure reduction zone 23 is controlled to be the predetermined pressure (first pressure). Namely, the pressure of the molten resin which is measured and the pressure in the plasticizing cylinder can be stably controlled to the pressure (first pressure) of the pressure reduction zone 23, without being depending on the introducing pressure of the physical foaming agent. By making the pressure (second pressure) not less than the pressure (first pressure) of the pressure reduction zone 23 to be the screw back pressure, the screw is capable of stably measuring the predetermined amount of the molten resin without being suddenly pushed back in the rearward direction due to the resin fed in the forward direction. In this embodiment, the fluctuation in the time during which the molten resin is plasticized and measured (plasticizing and measuring time) and the fluctuation in the amount of resin measured (amount of resin to be charged into the mold) are suppressed in every shot, thereby making it possible to perform a stable foam injection molding. Here, the term "plasticizing and measuring time (measuring time)" of the molten resin means a time spanning from a point of time at which the screw starts to rotate, after the molten resin has been injected and charged to the mold for a certain shot, so as to plasticize and measure the molten resin for another shot next to the certain shot, and until another point of time at which the screw is retreated (moved backward) to arrive at a plasticizing and measuring completion position by being moved backward by the resin pressure of the molten resin fed forward by the rotation of the screw.

The screw back pressure (second pressure) is preferably higher than the pressure of the pressure reduction zone 23 (first pressure) by a value in a range of 0.5 MPa to 5 MPa, more preferably higher than the first pressure by a value in a range of 2 MPa to 3 MPa. In a case that the second pressure is too higher than the first pressure, the screw can hardly retreat or move backward during the plasticizing and measuring time, which in turn makes the measuring operation for measuring the molten resin by the screw be unstable. Further, this makes the plasticizing and measuring time to be long, and thus a time (cycle time) required to obtain a molded product in one shot becomes long, thereby lowering the productivity.

Furthermore, in order to improve the appearance characteristic of the foamed molded product, it is necessary to suppress the separation of the physical foaming agent from the molten resin when the molten resin containing the physical foaming agent is charged to the mold. If the pressure (first pressure) of the pressure reduction zone 23 is too high, then when the molten resin containing the physical foaming agent is charged into the cavity of the mold, the differential pressure provided before and after the charging of the molten resin becomes great, which in turn causes the physical foaming agent to be separated from the molten resin at the forward end portion in the flow of the molten resin during the charging. This generates a pattern having an elongated shape referred to as a swirl mark, and/or having a broken foam due to the expansion or swelling of the cell, and thus any satisfactory appearance cannot be obtained. On the other hand, in a case that the screw back pressure (second pressure) is lower than the pressure (first pressure) of the pressure reduction zone 23, the screw is moved backward by the pressure of the physical foaming agent, which in turn causes such a situation that the physical foaming agent and the molten resin are charged into the mold in a state that the physical foaming agent and the molten resin are separated from each other at the inside of the forward end portion of the cylinder. This also causes the generation of the swirl mark and or the broken foam, and thus any satisfactory appearance cannot be obtained.

Accordingly, from the viewpoint of improving the appearance characteristic of the foamed molded product, the pressure (first pressure) in the pressure reduction zone 23 is preferably not more than 6 MPa, more preferably is in a range of 2 MPa to 4 MPa; in addition, the screw back pressure (second pressure) is preferably a pressure higher than the first pressure by a value in a range of 0.5 MPa to 5 MPa, preferably higher than the first pressure by a value in a range of 2 MPa to 3 MPa. By setting the pressure (first pressure) in the pressure reduction zone 23 to be a low pressure that is not more than 6 MPa, the differential pressure provided before and after the charging into the mold becomes small, thereby suppressing the separation of the physical foaming agent from the molten resin. Further, by setting the screw back pressure (second pressure) to be higher than the first pressure, the separation of the physical foaming agent from the molten resin can also be suppressed at the forward end portion of the cylinder, thereby suppressing the generation of swirl mark and/or of broken foam.

Subsequently, the molten resin of which pressure is controlled as described above is foamed, and the molten resin is molded to have a desired shape (Step S8 in FIG. 1). In this embodiment, a molded product having foamed cells formed therein (foamed molded product) is produced as follows: namely, by moving the screw 20 frontwardly by the screw driving mechanism 260 after completing the plasticization and measuring, by injecting and charging the molten resin into a mold having a predetermined internal shape, and suddenly reducing the pressure of the molten resin containing the physical foaming agent, thereby producing the foamed molded product. In this embodiment, the molten resin is injected from the forward end portion of the plasticizing cylinder 210 into a cavity 253 of the clamping unit 250, and the mold is slightly opened (core back) without applying any dwell or follow-up pressure, and thus the formation of a molded product is completed.

As described above, according to the method for producing the foamed molded product, the amount of the physical foaming agent introduced into the plasticizing cylinder can be stably controlled for each shot. Further, according to the method for producing the foamed molded product, it is possible to stabilize the measuring operation for measuring the molten resin by the screw inside the plasticizing cylinder.

In the following, the present teaching will be explained more specifically based on examples. However, the present teaching is not limited to the examples.

EXAMPLES

Example 1

In Example 1, a thermoplastic resin molded product (foamed molded product), in which a functional material was dispersed, was produced by the foam injection molding by using a molding machine 1000 provided with a kneading apparatus 200 as depicted in FIG. 2. Pressurized carbon dioxide was used as the physical foaming agent. Nylon 6 containing glass fiber by 30% was used as the thermoplastic resin, hexafluoroacetylacetona palladium (II) as an organic metal complex was used as the functional material, and perfluoropentylamine as a fluorine-based organic solvent was used as the solvent for dissolving the functional material. The amount of introduction of the mixture pressurized fluid was adjusted so that the concentration of carbon dioxide was 2.5 wt % and the concentration of the organic metal complex was about 100 ppm with respect to the molten resin of each one shot. Further, the pressure of the pressure reduction zone 23 was controlled to be 2 MPa, the screw back pressure was controlled to be 5 MPa.

<Molding Machine>

As described above, the molding machine 1000 depicted in FIG. 2 is provided with the physical foaming agent supplying apparatus 100, the kneading apparatus 200, the clamping unit 250, and the control unit (not depicted) which controls the operations of the physical foaming agent supplying apparatus 100, the kneading apparatus 200 and the clamping unit 250. The physical foaming agent supplying apparatus 100 mixes pressurized carbon dioxide and a solution C obtained by dissolving the functional material in the solvent so as to prepare a mixture pressurized fluid, and the prepared mixture pressurized fluid is supplied to the plasticizing cylinder 210.

Any apparatus may be used as the physical foaming agent supplying apparatus 100, provided that the physical foaming agent supplying apparatus 100 is such a mechanism that the functional material is dissolved or dispersed in pressurized carbon dioxide to be introduced into the plasticizing cylinder 210. However, this embodiment uses such a supplying apparatus that is provided with a syringe pump such as a syringe or injector for sucking, for example, pressurized carbon dioxide and performing liquid feeding. The physical foaming agent supplying apparatus 100 of this embodiment is the apparatus which mixes and supplies pressurized carbon dioxide and the functional material. The physical foaming agent supplying apparatus 100 is constructed by a syringe pump 102 for carbon dioxide which sucks liquid carbon dioxide from a carbon dioxide bomb 101 of the siphon type and which thereafter pressurizes and supplies liquid carbon dioxide, and a syringe pump 112 for the solution which pressurizes and supplies the functional material-containing liquid C. The respective syringe pumps 102, 112 can be subjected to the pressure control and the flow rate control. An air operate valve for suction 104 is arranged for a piping connecting the liquid carbon dioxide bomb 101 and the syringe pump 102 for carbon dioxide, and an air operate valve for supply 105 is arranged for a piping connecting the syringe pump 102 for carbon dioxide and the plasticizing cylinder 210. Further, an air operate valve for suction 114 is arranged for a piping connecting a solution tank 111 and the syringe pump 112 for the solution, and an air operate valve for supply 115 is arranged for a piping connecting the syringe pump 112 for the solution and the plasticizing cylinder 210.

<Molding Method>

At first, the air operate valve for suction 104 is opened, and liquid carbon dioxide is sucked from the liquid carbon dioxide bomb 101. Subsequently, liquid carbon dioxide is pressurized to arrive at a predetermined pressure in accordance with the pressure control of the syringe pump 102 for carbon dioxide. In Example 1, the head of the syringe pump 102 for carbon dioxide and the intermediate passage were cooled to 10° C., and pressurized carbon dioxide having a pressure of 10 MPa and a temperature of 10° C. was prepared.

Further, the air operate valve for suction 114, which is disposed on the side of the syringe pump 112 for the solution, is opened to suck the solution C, containing the functional material dissolved in the solvent, from the solution tank 111 via a filter 113 at ordinary temperature, and the solution C is pressurized to arrive at a predetermined pressure in accordance with the pressure control of the syringe pump 112 for the solution. In Example 1, the solution C was pressurized to 10 MPa.

Subsequently, the air operate valves for supply 105, 115 are opened, and then the syringe pump 102 for carbon dioxide and the syringe pump 112 for the solution are switched from the pressure control to the flow rate control. Pressurized carbon dioxide and the pressurized solution C are allowed to flow so as to provide a predetermined flow rate ratio. Accordingly, pressurized carbon dioxide and the solution C are mixed in the piping. Further, the interior of the system, which ranges to the introducing valve 212 for introducing the mixture pressurized fluid into the plasticizing cylinder 210, is pressurized. In Example 1, the supply volume ratio between pressurized carbon dioxide and the solution C was set to 5:1. In a case of using the mixture pressurized fluid, in which the volume ratio between pressurized carbon dioxide and the solution C is within a certain range (1:1 to 10:1), the thermal decomposition of the organic metal complex can be avoided by pressurized carbon dioxide in the kneading step, and pressurized carbon dioxide can be allowed to function as a compatibility-providing agent to assist the dispersion of the organic metal complex in the molten resin. In Example 1, the concentration of the functional material in the mixture pressurized fluid was controlled to be a value in a range of about 10% to about 20% of the saturated solubility.

On the other hand, the thermoplastic resin was supplied from the resin supplying hipper 211 of the kneading apparatus 200, the plasticizing zone 21 was heated by the band heater (not depicted) provided on the portion of the outer wall surface, of the plasticizing cylinder 210, corresponding to the plasticizing zone 21, and the screw 20 was rotated frontwardly. Accordingly, the thermoplastic resin was heated and kneaded to provide the molten resin. In Example 1, the plasticizing zone 21 of the plasticizing cylinder 210 was heated so that the temperature of the molten resin was in a range of 210° C. to 240° C.

The molten resin was allowed to flow from the plasticizing zone 21 to the high pressure kneading zone 22 by rotating the screw 20 forwardly. The rotation of the screw 20 was once stopped at a position before arrival at the plasticization and measuring completion position by 20 mm (position on the mold side) in order to disconnect the high pressure kneading zone 22 from the pressure reduction zone 23 and the plasticizing zone 21, and then the screw 20 was reversely rotated (number of revolutions: 50 rpm). Accordingly, the upstream side and downstream side seal rings 40, 60 were moved to the upstream side, and the tapered surfaces of the truncated cone portions 31, 51 were allowed to abut against the tapered surfaces of the tapered portions 42, 62. Further, the upstream side and downstream side seal rings 40, 60 were allowed to corotate together with the screw 20. Thus, the gaps G were closed between the inner circumferential surfaces of the upstream side and downstream side seal rings 40, 60 and the outer circumferential surface of the screw 20, and the high pressure kneading zone 22 was disconnected from the pressure reduction zone 23 and the plasticizing zone 21.

As depicted in FIG. 2, the introducing valve 212 is provided at the introducing port 202 of the plasticizing cylinder 210 in order to introduce the pressurized fluid. The introducing valve 212 has a fluid supply port 218 which is disposed at a proximal end portion thereof connected to the introducing port 202 of the plasticizing cylinder 210, and the introducing valve 212 has an introducing piston 217 which is disposed therein. Therefore, when the fluid supply port 218 is opened by the introducing piston 217, the mixture pressurized fluid is thereby introduced from the physical foaming agent supplying apparatus 100 into the plasticizing cylinder 210 at an arbitrary timing. In Example 1, the mixture pressurized fluid was introduced by opening the fluid supply port 218 in conformity with the driving of the syringe pumps 102, 112 after sealing the high pressure kneading zone 22 by the upstream side and downstream side seal mechanisms S1, S2, and the mixture pressurized fluid was intermittently introduced for every shot in accordance with the flow rate control so that the mixture pressurized fluid was allowed to stay in the high pressure kneading zone 22 for 1 second. Thus, the molten resin and the mixture pressurized fluid were brought in contact and kneaded with each other. In Example 1, the mixture pressurized fluid, which had a pressure of 10 MPa and a temperature of 10° C., was introduced by 3.5 wt % for 1 shot (weight: 75 g) of the molded product.

The pressure in the plasticizing cylinder 210, which was monitored by a pressure sensor 25 provided just under the introducing valve 212, was 2 MPa before the introduction of the mixture pressurized fluid. The pressure was raised to 9 MPa at the maximum after the introduction of the mixture pressurized fluid.

On the other hand, when the communication between the high pressure kneading zone 22 and the pressure reduction zone 23 was shut off by the downstream side seal mechanism S2, the pressure of the pressure reduction zone 23 was controlled to a constant pressure by the pressure reduction zone pressure adjusting mechanism 219 so that the pressure was not less than the atmospheric pressure and the pressure was not more than the maximum achieved pressure of the high pressure kneading zone 22. In Example 1, the back pressure valve was set to 2 MPa, and the pressure of the pressure reduction zone 23 was always controlled to 2 MPa. Before the start of the molding, pressurized nitrogen was introduced into the pressure reduction zone 23 by using the pressurizing mechanism 2. Accordingly, the pressure reduction zone was pressurized, and the vent up was suppressed. After the start of the molding, an unillustrated valve was closed, and only the gas discharge was performed by the function of the back pressure valve.

The mixture pressurized fluid, which was introduced into the high pressure kneading zone 22, was dispersed in a high pressure state in the molten resin in the high pressure kneading zone 22. After that, the screw 20 was rotated frontwardly (in the direction of rotation of the screw to perform the plasticization), or the number of the reverse rotation of the screw 20 was reduced, and thus the high pressure kneading zone 22 and the pressure reduction zone 23 were communicated with each other. In Example 1, the number of the reverse rotation of the screw 20 was lowered (number of revolutions: 30 rpm), and the upstream side and downstream side seal rings 40, 60 were returned to the original downstream side positions. With this, the tapered surfaces of the truncated cone portions 31, 51 were separated from the tapered surfaces of the tapered portions 42, 62, the gaps G were opened between the inner circumferential surfaces of the upstream side and downstream side seal rings 40, 60 and the outer circumferential surface of the screw 20, and the high pressure kneading zone 22 and the pressure reduction zone 23 were communicated with each other. Subsequently, the screw 20 was returned to perform the forward rotation, and the molten resin was allowed to flow to the pressure reduction zone 23.

As for the molten resin and the mixture pressurized fluid allowed to flow to the pressure reduction zone 23, the pressure was lowered to 2 MPa as the preset pressure of the pressure reduction zone. Accordingly, any excessive or surplus pressurized carbon dioxide was gasified and separated from the molten resin, and then surplus pressurized carbon dioxide was discharged from the gas discharge port 11 of the pressure reduction zone pressure adjusting mechanism 219 via the vent 203 of the plasticizing cylinder 210. It is presumed that the concentration of the physical foaming agent in the molten resin was allowed to approach the saturated solubility by the above-described control of the pressure of the atmosphere of the molten resin (the pressure around the molten resin).

In Example 1, the pressure reduction zone 23 was cooled by the cooling jacket, and the pressure reduction zone 23 was controlled to the temperature lower by 50° C. than those of the other zones. Specifically, the pressure reduction zone was at 190° C., the kneading zone was at 240° C., and the remelting zone was at 240° C. Accordingly, the molten resin had a high viscosity in the pressure reduction zone 23, and the vent up from the vent 203 was not caused. In a case that a plasticizing screw not provided with the mechanism such as the cooling jacket or the like for controlling the temperature of the pressure reduction zone 23 to the temperature lower than those of the other zones was used, it was impossible to allow the temperature of the pressure reduction zone 23 to be not more than 210° C., and the vent up of the molten resin was caused.

Further, in Example 1, when carbon dioxide was discharged, the flat portion 20B, of the screw 20, which had no flight, was positioned in the pressure reduction zone 23. Therefore, even in the case of the cooled molten resin having a high viscosity, the molten resin was successfully allowed to flow efficiently to the remelting zone 24 disposed on the downstream.

Subsequently, the molten resin was heated and remelted in the remelting zone 24 set to 240° C. After that, the molten resin was fed to the forward end portion of the plasticizing cylinder 210 by the first flight portion 20A of the screw 20 to complete the plasticization and measuring. After that, the shutoff valve 36 was opened, and the molten resin was injected and charged into the cavity 253. Subsequently, the mold was slightly opened (core back) by 2.0 mm without applying any dwell or follow-up pressure so as to suddenly reduce the pressure in the inside of a molded product, and thus a molded product having foamed cells formed therein (foamed molded product) was obtained.

The above-explained injection molding was continuously performed for the molded product for 100 shots, and 100 pieces of the molded product were obtained. The pressure fluctuation in the plasticizing cylinder was monitored for 100 shots by the pressure sensor 25 provided just under the introducing valve 212. As a result, the pressure before the introduction of the mixture pressurized fluid was constant, i.e., 2 MPa, and the maximum achieved pressure upon the introduction was 9±0.5 MPa as well, wherein any large fluctuation was not observed between the shots.

As for 100 pieces of the obtained molded products, all of 100 pieces were colored to be light brown, and no individual difference was observed in relation to the color tone of each of the molded products. According to this fact, it is presumed that the organic metal complex is introduced into each of the molded products, and there is no difference in the amount of the organic metal complex introduced into each of the molded products among the respective shots.

100 pieces of the molded products obtained in Example 1 had the specific gravity which was lighter by 35% than that of a solid (non-foamed molded product) having a same thickness as that of the foamed molded product after the core back. The average cell diameter of the portion of the foamed molded product, which was positioned in the vicinity of the gate of the mold during the injection molding, was about 30 μm which was fine and minute, and the density of the foamed cells was high as well. Further, among the 100 pieces of the obtained molded products, there was no such a molded product which had any blister generated or formed on the surface thereof. According to this fact, it is presumed that the separation was not caused between the molten resin and the physical foaming agent in the plasticizing cylinder.

Further, the measuring time of the molten resin was measured for each of 100 shots. As a result, the fluctuation in the measuring time was about 2.5% that was small. Further, the fluctuation in the weight among 100 pieces of the obtained foamed molded products was about 0.50% that was small. From these results, it was appreciated that the measuring operation by the screw for measuring the molten resin was stable.

<Formation of Plating Film>

Further, in order to confirm whether or not the organic metal complex is satisfactorily dispersed in the obtained foamed molded product, an electroless plating process was performed for the molded product. The electroless plating process was performed as follows. Namely, at first, the molded product was immersed for 10 minutes in an aqueous solution containing 1, 3-butanediol by 75% by volume at 85° C. Subsequently, the molded product was immersed in an electroless nickel plating solution for 15 minutes at 85° C. The plating was applied to 100 pieces of the foamed molded products. As a result, a plating film was formed on the entire surface in relation to all of 100 pieces of the molded products. Any defect such as the film missing of the plating film or the like was not caused.

Further, 20 μm of bright Cu electroplating and 20 μm of bright Ni electroplating were formed on the electroless plating film to obtain a plastic plating part (component). The obtained plastic plating part had a specific gravity of 0.9 which was light in weight, and the appearance thereof had a texture (quality or feel of material) of metal equivalent to that of any decorative plating part. Further, a heat shock test was performed for the obtained plastic plating part. In Example 1, the process, in which the plastic plating part was alternately placed in an environment at 90° C. and in an environment at −35° C., was repeated for three cycles. As a result, any problem such as the film blister of the plating film or the like was not caused.

In Example 1, the pressure of the pressure reduction zone 23 was controlled to the predetermined pressure (first pressure); further the pressure (second pressure) not less than the pressure (first pressure) in the pressure reduction zone 23 was made to be the screw back pressure, and the plasticization and measurement of the resin were performed. By doing so, the fluctuation in the plasticizing and measuring time of the molten resin for each shot (among the respective shots) and the fluctuation in the amount of resin measured (amount of resin to be charged into the mold) for each shot (among the respective shots) were suppressed.

Example 2

Figure 10:
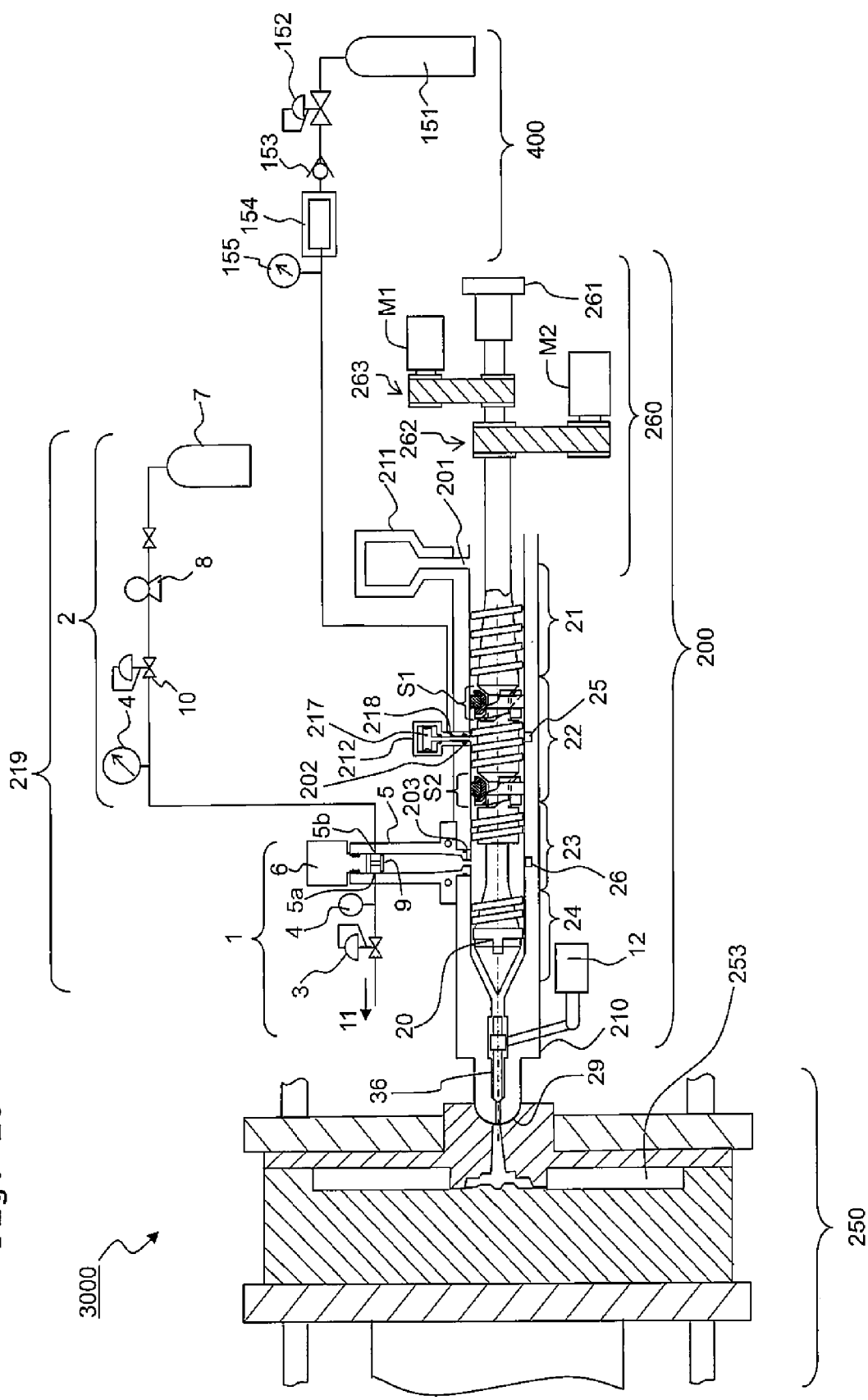
FIG. 10 is a schematic cross-sectional view of a molding machine used in Example 2.

In Example 2, a foamed molded product was produced by the foam injection molding by using a molding machine 3000 depicted in FIG. 10. The molding machine 3000 is constructed in a similar manner as the molding machine 1000 depicted in FIG. 2, except that the physical foaming agent is supplied to the plasticizing cylinder 210 by using a physical foaming agent supplying apparatus 400 having no syringe pump, instead of using the physical foaming agent supplying apparatus 100. In Example 2, pressurized nitrogen was used as the physical foaming agent, and a thermoplastic resin, which was the same as or equivalent to that used in Example 1, was used. In Example 2, the measurement of the amount of introduction of the physical foaming agent for the supply thereof to the plasticizing cylinder 210 were not performed. Further, in Example 2, any functional material was not used. In Example 2, the pressure of the pressure reduction zone 23 was controlled to be 4 MPa, and the back pressure of the screw was controlled to be 6.5 MPa.

The physical foaming agent supplying apparatus 400 is such an apparatus to allow nitrogen, which is contained in a nitrogen bomb 151 having an internal pressure of 14 MPa, to flow via a small-sized container 154 having a volume of 30 ml, and to supply nitrogen from the introducing port 202 into the plasticizing screw 210. A pressure-reducing valve 152 and a check valve (non-return valve) 153 are provided between the nitrogen bomb 151 and the small-sized container 154; and a pressure gauge 155 is provided between the small-sized container 154 and the introducing port 202.

In the physical foaming agent supplying apparatus 400, the nitrogen gas in the nitrogen bomb 151 was stored in the small-sized container 154 via the check valve 153. In this procedure, the nitrogen gas was subjected to the pressure reduction by the pressure-reducing valve 152 so that the indication of the pressure gauge 155 was 10 MPa.

The thermoplastic resin was plasticized and melted by the kneading apparatus 200 in the same manner as in Example 1, and the molten resin was allowed to flow to the high pressure kneading zone 22. The screw 20 was rotated reversely in the same manner as in Example 1, and the high pressure kneading zone 22 was shut off from the pressure reduction zone 23 and the plasticizing zone 21 by the upstream side and downstream side seal mechanisms S1, S2. The screw 20 was stopped, and then the physical foaming agent was subsequently supplied to the high pressure kneading zone 22. In this procedure, the amount of introduction of the physical foaming agent was not measured. The introducing valve 212 was closed in conformity with the timing at which the value of the pressure gauge 155 indicating the pressure of the physical foaming agent in the small-sized container 154 was equal to the value of the pressure sensor 22 in the high pressure kneading zone 22, and the supply was stopped.

On the other hand, when the high pressure kneading zone 22 and the pressure reduction zone 23 are disconnected from each other by the downstream side seal mechanism S2, the pressure of the pressure reduction zone 23 was controlled to 4 MPa by the pressure reduction zone pressure adjusting mechanism 219.

Subsequently, the high pressure kneading zone 22 and the pressure reduction zone 23 were communicated with each other by the downstream side seal mechanism S2 in the same manner as in Example 1, and the molten resin, into which the physical foaming agent was introduced, was allowed to flow to the pressure reduction zone 23 disposed on the downstream.

The molten resin and the physical foaming agent, which were allowed to flow to the pressure reduction zone 23, were subjected to the pressure reduction in the same manner as in Example 1, and any surplus physical foaming agent was discharged from the gas discharge port 11. In this procedure, the vent up was not caused from the vent 203. It is presumed that the concentration of the physical foaming agent in the molten resin approached the saturated solubility in accordance with the control of the pressure of the atmosphere of the molten resin (pressure around the molten resin) as described above. Further, the molten resin was fed to the remelting zone 24 disposed on the downstream in the same manner as in Example 1. After the completion of the plasticization and measuring, the molten resin was injected and charged into the cavity 253 so that the filling rate of the molten resin was 75% with respect to the inside of the cavity 253, and thus a foamed molded product was obtained.

The foam injection molding was continuously performed as explained above for 100 shots, and 100 pieces of the molded products were obtained. The pressure fluctuation in the plasticizing cylinder was monitored for 100 shots by the pressure sensor 25 provided just under the introducing valve 212. As a result, the pressure before the introduction of the physical foaming agent was constant, i.e., 4 MPa, and the maximum achieved pressure upon the introduction was 8±0.2 MPa as well, wherein any large fluctuation was not observed between the shots.

100 pieces of the molded products obtained in Example 2 had the specific gravity which was lighter by 15% than that of the solid (non-foamed molded product). The average cell diameter of the portion of the foamed molded product, which was positioned in the vicinity of the gate of the mold during the injection molding, had a value in a range of about 10 $\mu$m to about 20 $\mu$m which was fine and minute, and the density of the foamed cells was high as well. Further, in Example 2, among the 100 pieces of the obtained foamed molded products, there was no such a molded product which had any blister generated or formed on the surface thereof. According to this fact, it is presumed that the separation was not caused between the molten resin and the physical foaming agent in the plasticizing cylinder.

Further, the measuring time of the molten resin was measured for each of 100 shots. As a result, the fluctuation in the measuring time was about 2.5% that was small. Further, the fluctuation in the weight among 100 pieces of the obtained foamed molded products was about 0.50% that was small. From these results, it was appreciated that the measuring operation for measuring the molten resin was stable.

In Example 2, the nitrogen gas in the nitrogen bomb 151 as the physical foaming agent was introduced into the plasticizing cylinder without being pressurized and without performing any strict flow rate control. In Example 2, the concentration of the physical foaming agent in the molten resin is controlled before the injection, and thus there is no need to strictly control the introducing amount of the physical foaming agent at the state of introducing the physical foaming agent into the plasticizing cylinder, and there is no need to make the introducing pressure to be a high pressure. Therefore, it is unnecessary for the physical foaming agent supplying apparatus 400 to have the flow rate control apparatus and the pressurizing apparatus, wherein it is possible to realize the low cost.

Comparative Example 1

In Comparative Example 1, the foam injection molding for producing a molded product was continuously performed for 100 shots, by using a similar apparatus and similar method as those in Example 1, except that the screw back pressure was set to be 0.5 MPa, and 100 pieces of the molded products were obtained.

100 pieces of the foamed molded products obtained in Comparative Example 1 had the specific gravity which was lighter by 35% than that of the solid (non-foamed molded product). However, according to a result of measuring the measuring time of the molten resin for each of 100 shots, the fluctuation in the measuring time was about 10% which was greater than that of Example 1. Further, the fluctuating in the weight of the foamed molded products was also 6.5% which was greater than that in Example 1. Furthermore, the average cell diameter of the portion of the foamed molded product, which was positioned in the vicinity of the gate of the mold during the injection molding had a value in a range of about 60 $\mu$m to about 80 $\mu$m which was more expanded than that in Example 1.

Moreover, in the 20 pieces among 100 pieces of the foamed molded product, the broken foam occurred in the foamed cells, and a swirl mark was formed in the surface thereof. In the 20 pieces of the foamed molded products, the average cell diameter of the portion of the foamed molded product, which was positioned in the vicinity of the gate of the mold during the injection molding had a value in a range of about 60 $\mu$m to about 100 $\mu$m which was much more expanded than that in Example 1. Further, in the 20 pieces of the foamed molded products in which the broken foam occurred, the measuring time was shorter by about 20% than that in other foamed molded products in which no broken foam occurred.

As the above-described results, the following is presumed. Namely, in Comparative Example 1, since the screw back pressure was set to be 0.5 MPa that was lower than the pressure of 2 MPa set in the pressure reduction zone 23, the screw was suddenly pushed back in the rearward direction due to the resin fed to the forward end portion of the plasticizing cylinder 210, the density of the resin at the forward end portion of the plasticizing cylinder 210 during the plasticizing and measuring was not stabilized, the fluctuation was occurred in the charging amount of the resin into the mold, thereby generating the broken foam, cell expansion and swirl mark.

<Formation of Plating Film>

The electroless plating process was performed for 100 pieces of the obtained formed molded product, by using a similar method as that in Example 1. Further, 20 $\mu$m of bright Cu electroplating and 20 $\mu$m of bright Ni electroplating were formed on the electroless plating film to obtain a plastic plating part.

A plating film was formed on the entire surface in relation to all of 100 pieces of the foamed molded products. Any defect such as the film missing of the plating film or the like was not caused. The obtained plastic plating part had a specific gravity of 0.9 which was light in weight. However, in the foamed molded products in which the swirl mark was generated, any satisfactory appearance could not be obtained due to the swirl mark.

Further, a heat shock test similar to that performed for Example 1 was performed regarding 100 pieces of the plastic plating parts. As a result, the film blister of the plating film or the like was caused in a part of the foamed molded products in which the broken foam occurred. The reason for this is presumed that the mechanical property of the foamed molded product was partially lowered due to the expansion of the cell diameter inside the foamed molded product.

Comparative Example 2

In Comparative Example 2, a foamed molded product was produced by the foam injection molding method, without controlling the pressure of the molten resin brought in contact and kneaded with the physical foaming agent. Namely, the molding was performed in a similar aspect as the conventional foam injection molding. Comparative Example 2 used, as the molding machine, a molding machine having an aspect similar to that of the molding machine 3000 used in Example 2, except that the molding machine used in Comparative Example 2 does not have the pressure reduction zone pressure adjusting mechanism 219, does not have a discharge port, such as the vent 203, via which the surplus physical foaming agent is discharged, and uses an ordinary screw having no flat portion 20B but having flight provided on the entirety thereof, instead of using the screw 20 having the flat portion 20B. The thermoplastic resin, the physical foaming agent and the method for introducing the physical foaming agent into the cylinder were made to be similar to those in Example 2. In Comparative Example 2, however, the communication between the high pressure kneading zone 22 and the pressure reduction zone 23 was not shut off; the control of the pressure in the pressure reduction zone 23 was not performed; and the physical foaming agent was not discharged from the plasticizing cylinder 210. The screw back pressure in Comparative Example 2 was made to be 6.5 MPa that is similar to the screw back pressure in Example 2.

At first, in a similar manner in Example 2, the thermoplastic resin was plasticized and melted in the kneading apparatus 200, and the molten resin was flowed into the high pressure kneading zone 22. In Comparative Example 2, the introducing valve 212 was opened in a state that the high pressure kneading zone 22 and the pressure reduction zone 23 were communicated with each other, and nitrogen contained in the nitrogen bomb 151 having an internal pressure of 14 MPa was supplied from the introducing port 202 into the plasticizing screw 210, via the small-sized container 154 having a volume of 30 ml. In this procedure, the nitrogen gas was subjected to the pressure reduction by the pressure-reducing valve 152 so that the indication of the pressure gauge 155 was 10 MPa.

Afterwards, the screw 20 was rotated frontwardly and the molten resin was fed to the forward end portion of the plasticizing cylinder 210, thereby completing the plasticization and measuring. Then, in a similar manner as in Example 2, the molten resin was injected and charged to the cavity 235 so that the filling rate of the molten resin was 75% with respect to the inside of the cavity 253, and thus a foamed molded product was obtained. It was possible to provide a desired shape to the obtained foamed molded product due to the foaming inside the molded product.

The above-explained foaming injection molding was continuously performed for the molded product for 100 shots, and 100 pieces of the molded product were obtained. Further, the pressure fluctuation in the plasticizing cylinder was monitored for 100 shots by the pressure sensor 25 provided just under the introducing valve 212. As a result, the maximum achieved pressure upon the introduction of the physical foaming agent was in a range of 7 MPa to 9 MPa that was a large fluctuation among the shots. In Comparative Example 2, since the communication was not shut off between the high pressure kneading zone 22 and the pressure reduction zone 23, the internal pressure inside the cylinder in the pressure reduction zone 23 also exhibited a value similar to that described above, and fluctuated. It is presumed that the viscosity and density of the molten resin and the internal pressure in the introducing portion, via which the physical foaming agent was introduced, were fluctuated between the shots, and thus the actual introducing amount of the physical foaming agent introduced from the introducing valve 212 was fluctuated.

100 pieces of the foamed molded products obtained in Comparative Example 2 had the specific gravity which was lighter by 15% than that of the solid (non-foamed molded product). However, according to a result of measuring the measuring time of the molten resin for each of 100 shots, the fluctuation in the measuring time was about 20% which was greater than that of Example 2. Further, the fluctuating in the weight of the foamed molded products was also about 2.5% which was greater than that in Example 2.

Furthermore, in the 20 pieces among 100 pieces of the foamed molded product, the resin was not charged up to the distal (far) end portion of the cavity 253, and thus was a foamed molded product (short shot) in which the desired shape was not obtained, and further had a failure in appearance such as blister, a swirl mark, etc. generated on the surface thereof.

From the above-described results, it is presumed that in Comparative Example 2, since the pressure was not controlled in the pressure reduction zone 23 and the physical foaming agent was not discharged from the plasticizing cylinder 210, the pressure in the pressure reduction zone 23 was not stabilized, and the phase separation occurred between the physical foaming agent and the molten resin. Further, it is also presumed that since the screw back pressure was lower than the pressure inside the plasticizing cylinder 210, the screw 20 was suddenly pushed back toward a back (rear) portion of the plasticizing cylinder 210 due to the resin pressure of the resin supplied to the forward end portion of the plasticizing cylinder 210, which in turn made the density of the molten resin, at the forward end portion of the plasticizing cylinder 210 during the plasticizing and measuring, to be unstable, thereby causing the generation of broken foam, cell expansion and swirl mark.

The present teaching has been explained above with reference to the embodiments and the examples. However, the present teaching is not limited to the embodiments and examples described above. The construction and details of the present teaching can be variously changed as understandable by those skilled in the art within a scope of the present teaching.

According to the present teaching, the operation of the screw when measuring the molten resin is stabilized. Accordingly, the fluctuation in the time during which the molten resin is plasticized and measured (plasticizing and measuring time) between the shots and the fluctuation in the amount of resin measured (amount of resin to be charged into the mold) between the shots are suppressed, thereby making it possible to perform a stable foam injection molding. Thus, according to the present teaching, a foamed molded product can be produced industrially and stably.

The invention claimed is:

1. A method for producing a foamed molded product, the method comprising:
   using a molding apparatus including a plasticizing cylinder having a high pressure kneading zone in which a molten resin, obtained by plasticizing a thermoplastic resin, is brought in contact and kneaded with a physical foaming agent, and a pressure reduction zone in which the gasified physical foaming agent is discharged from the molten resin brought in contact and kneaded with the physical foaming agent; and a screw arranged rotatably and movably back and forth in the plasticizing cylinder;
   plasticizing the thermoplastic resin to provide the molten resin;
   shutting off communication between the high pressure kneading zone and the pressure reduction zone;
   bringing in contact and kneading the molten resin with the physical foaming agent in a state that the communication between the high pressure kneading zone and the pressure reduction zone is shut off;
   controlling a pressure of the pressure reduction zone to be a first pressure in a state that the communication between the high pressure kneading zone and the pressure reduction zone is shut off, the first pressure being not less than an atmospheric pressure and not more than a maximum pressure of the high pressure kneading zone which is reached in a case that the molten resin is brought in contact and kneaded with the physical foaming agent;
   communicating the high pressure kneading zone and the pressure reduction zone;
   lowering a pressure of the molten resin brought in contact and kneaded with the physical foaming agent so as to separate the gasified physical foaming agent from the molten resin;
   controlling a back pressure of the screw to be a second pressure which is not less than the first pressure;
   measuring a predetermined amount of the molten resin from which the gasified physical foaming agent has been separated; and
   foaming and molding the measured molten resin into a desired shape.

2. The method for producing the foamed molded product according to claim 1, wherein the second pressure is greater than the first pressure by a value in a range of 0.5 MPa to 5 MPa.

3. The method for producing the foamed molded product according to claim 1, wherein the second pressure is not more than 10 MPa.

4. The method for producing the foamed molded product according to claim 1, wherein the controlling of the pressure of the pressure reduction zone includes controlling a pressure of a gas in the pressure reduction zone.

5. The method for producing the foamed molded product according to claim 1, wherein the controlling of the pressure of the pressure reduction zone includes introducing an inert gas into the pressure reduction zone so as to pressurize the pressure reduction zone and/or discharging the gasified physical foaming agent from the pressure reduction zone by using a back pressure valve.

6. The method for producing the foamed molded product according to claim 1, wherein in a case that the gasified physical foaming agent is separated from the molten resin, a temperature of the pressure reduction zone is controlled to be lower than a temperature of the high pressure kneading zone.

7. The method for producing the foamed molded product according to claim 6, wherein in a case that the gasified physical foaming agent is separated from the molten resin, the pressure reduction zone is cooled.

8. The method for producing the foamed molded product according to claim 1, wherein a process, in which the molten resin and the physical foaming agent are brought in contact and kneaded with each other and the gasified physical foaming agent is separated from the molten resin, is repeated a plurality of times in a state that the molten resin is allowed to stay in the high pressure kneading zone.

9. The method for producing the foamed molded product according to claim 8, wherein a process, in which the high pressure kneading zone and the pressure reduction zone are communicated with each other and shut off from each other, is repeated a plurality of times.

10. The method for producing the foamed molded product according to claim 1, wherein the physical foaming agent, which is to be brought in contact and kneaded with the molten resin, is supplied to the high pressure kneading zone without controlling a supply amount of the physical foaming agent.

11. The method for producing the foamed molded product according to claim 1, wherein the physical foaming agent is pressurized nitrogen or pressurized carbon dioxide.

12. The method for producing the foamed molded product according to claim 1, wherein the physical foaming agent is pressurized carbon dioxide and further contains a functional material.

13. The method for producing the foamed molded product according to claim 12, wherein the functional material is a metal complex.

14. The method for producing the foamed molded product according to claim 1, wherein a concentration of the physical foaming agent in the molten resin is allowed to approach a saturated solubility by separating the gasified physical foaming agent from the molten resin.

15. The method for producing the foamed molded product according to claim 1, wherein the communication between the high pressure kneading zone and the pressure reduction zone is shut off in accordance with a rotation state of the screw.

16. The method for producing the foamed molded product according to claim 15, wherein the communication between the high pressure kneading zone and the pressure reduction zone is shut off by reverse rotation of the screw.

17. The method for producing the foamed molded product according to claim 15, wherein the high pressure kneading zone and the pressure reduction zone are communicated with each other by any one of forward rotation of the screw, stop of rotation of the screw, and decrease in a number of reverse rotation of the screw.

* * * * *